US010789822B1

(12) United States Patent
Deutsch

(10) Patent No.: US 10,789,822 B1
(45) Date of Patent: Sep. 29, 2020

(54) MONITORING HAND PROXIMITY AND CONTACT WITH SELECT OBJECTS

(71) Applicant: Richard Deutsch, Garner, NC (US)

(72) Inventor: Richard Deutsch, Garner, NC (US)

(*) Notice: Subject to any disclaimer, the term of this patent is extended or adjusted under 35 U.S.C. 154(b) by 0 days.

(21) Appl. No.: 16/516,241

(22) Filed: Jul. 18, 2019

(51) Int. Cl.
    *G06K 9/00*     (2006.01)
    *G08B 13/196*     (2006.01)
    *H04N 5/232*     (2006.01)

(52) U.S. Cl.
    CPC ... *G08B 13/19695* (2013.01); *G06K 9/00362* (2013.01); *G06K 9/00771* (2013.01); *G08B 13/1966* (2013.01); *G08B 13/19684* (2013.01); *G08B 13/19689* (2013.01); *H04N 5/23203* (2013.01); *H04N 5/23296* (2013.01); *H04N 5/23299* (2018.08)

(58) Field of Classification Search
CPC .......... G08B 13/19695; G08B 13/1966; G08B 13/19689; G08B 13/19684; H04N 5/23299; H04N 5/23296; H04N 5/23203; G06K 9/00362; G06K 9/00771
See application file for complete search history.

(56) References Cited

U.S. PATENT DOCUMENTS

| | | | |
|---|---|---|---|
| 6,236,736 B1* | 5/2001 | Crabtree | G01S 3/7865 235/383 |
| 9,125,380 B2 | 9/2015 | Deutsch | |
| 9,275,809 B2 | 3/2016 | Panay | |
| 10,231,440 B2 | 3/2019 | Seltzer | |
| 2002/0017567 A1 | 2/2002 | Connolly | |
| 2002/0196342 A1* | 12/2002 | Walker | G07F 17/32 348/157 |
| 2003/0018522 A1* | 1/2003 | Deninnarck | G06Q 30/0255 705/14.23 |
| 2005/0064926 A1* | 3/2005 | Walker | G07F 17/3237 463/16 |
| 2008/0274798 A1* | 11/2008 | Walker | G07F 17/32 463/25 |
| 2010/0013921 A1* | 1/2010 | Joko | H04N 7/181 348/143 |
| 2011/0131105 A1* | 6/2011 | Aonuma | G06Q 20/209 705/24 |
| 2019/0005343 A1* | 1/2019 | Srivastava | G06K 9/346 |
| 2019/0088096 A1* | 3/2019 | King | G08B 13/19665 |

* cited by examiner

*Primary Examiner* — Howard D Brown, Jr.
(74) *Attorney, Agent, or Firm* — Gregory M. MacDonald, Esq.; Gregory MacDonald

(57) ABSTRACT

The present invention involves a system and method for monitoring and controlling a person's select activity with a select object or space, with and without electronic imaging, while communicating and recording such interaction to a remote device. The system comprises a specialized computing device comprising a capacitance charge controller, a detection electrode, a wireless means of communications, a remote monitoring device capable of receiving a control signal directly or indirectly from the capacitance charge controller, at least one annunciator, at least one processor, an imaging device and at least one non-transitory computer readable medium. The method comprises receiving data from a specialized communication device, over a cellular, wireless, satellite, or other network to a special purpose computer with a non-transitory computer readable medium.

25 Claims, 10 Drawing Sheets

MONITORING HAND PROXIMITY AND CONTACT WITH SELECT OBJECTS

CROSS-REFERENCE TO RELATED APPLICATION

Not Applicable

STATEMENT REGARDING FEDERALLY SPONSORED RESEARCH OR DEVELOPMENT

Not Applicable THE NAMES OF THE PARTIES TO A JOINT RESEARCH AGREEMENT
Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR

Not Applicable

BACKGROUND

Unless otherwise indicated herein, the materials described in this section are not prior art to the claims in this application and are not admitted to be prior art by inclusion in this section.

1. FIELD OF THE INVENTION

The present invention relates generally to a system or a method for monitoring an object. More specifically, the present invention relates to a system or a method for electronically and visually remotely monitoring a person or the intrusion of a person's hands into a specific area within the proximity of a specific area and contact with at least one select object for purposes of security or observational needs.

2. DESCRIPTION OF RELATED ART

A video monitoring security system may monitor physical access to certain areas in numerous situations. However, these systems are often limited to simply detecting a person when he or she enters a viewing area. Also, many of these systems lend themselves to false triggering. In addition, many of these systems lack specificity in providing images and warnings related to either the proximity or contact of a person with a single select object in a small finite area. Additionally, the activation of such monitoring systems lends themselves to collecting copious amounts of useless video data that may have no relevance for the intended purpose of monitoring a person's association with a specific object or area of interest. For example, the video may not record a person touching or accessing a specific finite area, but may just collectively monitor and record a person's mere presence while positioned near a monitored object or area. Thus, it is easy to see how erroneous triggering, notification and recording may arise from persons within a monitored area that may have no relevance to or interaction with the select monitored object or area.

Furthermore, pets, passersby, motions and shadows may create false positive triggering of the previously provided monitoring system causing unnecessary warnings and image captures. Therefore, these past technologies fail to adequately address the need for a means of precision in detecting, monitoring, recording and notifying when individuals are either in contact with or in the near proximity of a specific area of interest. These areas may be directly or remotely monitored. As a result, these systems generate false alarms making them limited in use and dependability for many situations. Therefore, there is a need for a system or method that has expanded uses, which are useful, effective, accurate, and inexpensive.

BRIEF SUMMARY OF THE INVENTION

It is a principal object to solve at least one of the disadvantages with other attempted solutions or to create other utility by providing a system or method that is useful, effective, accurate, and inexpensive.

Use of a motion sensing passive infrared (PIR) detector reacting to proximate bodies is a technology commonly in use. Alternately, there is currently available the electronic means of motion detection via video imaging tracking, software object recognition, and frame change. Frame change electronically detects a change of pixel count within a scene as viewed by an imaging device as referenced against a pre-established "reference image" as retained in electronic memory. The change detection sensor, or inter-frame comparison sensor, relies both on a threshold in terms of the active number of pixels to activate a new frame or image. These past inventions attempt to produce a single design product for all motion and presence detection causing camera activated security warnings irrespective of the size or character of the person's actions or their physical contact with monitored objects or spaces. The result is that these devices tend to provide false positive alerts when something other than the monitored object or area is disturbed by a person.

In particular, the existing devices are more effectively designed for detecting large changes in scenes or environments, but do not function as effectively for small changes. In effect, they lack precision to differentiate between the gross presence of an individual within a monitored area and the activity of the placement or proximity of a hand or body where it is not desired. This lack of precision in compiling relevant alerts and images results in copious amounts of information being recorded and forwarded when such data does not include any useful information regarding the activity or contact with the area of interest. For example, current PIR or frame change motion activated video monitoring systems may provide recording and forwarding of announcements and images of persons and their presence within a monitored space. Such recorded information and forwarded notifications of their presence may be of little or no benefit. This may be especially true when interactions with a specific space or an individual's interaction with a specific object (and not their mere presence) is the focus or intent of the monitoring. At least one method of monitoring, for many monitoring applications as referenced herein, should include the ability to detect not only the presence of an individual, but also the ability to detect the proximity or the touch of a said person's hand near a valuable, an important monitored object, or designated area. This may be to provide monitoring, recording of physical contact or proximity, remotely alerting, and providing of a visual image of such actions to persons that have an interest in knowing about such specific hand contact. The imaging system may be configured to ignore the presence of a person within an allowable space surrounding a monitored object until contact or proximity is detected. Electronic determination of such action may cause the generation of a "Push Message" or alternately some form of notification, either remote or local, to allow imaging of the scene or action on a remote monitoring device. In view of the foregoing, there is a need for improved systems and techniques for controlling and monitoring secure areas of interest.

Disclosed herein are systems and methods for monitoring and controlling a person's interaction with select monitored objects and spaces. In at least one embodiment, the security monitoring system of the present invention comprises a specialized computing device comprising a capacitance charge controller, a detection electrode, a wireless means of communications, a remote monitoring device capable of receiving a control signal directly or indirectly from the capacitance charge controller, at least one annunciator, at least one processor, and at least one non-transitory computer readable medium of which a least one of this group of components may be co-located with the other.

In at least one embodiment, the system includes at least one detection electrode, a computing device, a signaling device, and an optional digital camera. The computing device is configured for movement or proximity detection, so as to detect a change of electrical capacitance or charge at a detection electrode operatively associated with a monitored select object or space caused by detection of a physical contact with such object. The computing device is also configured to determine a person's hand position relative to a system associated select monitored object or monitored space based on the change in the electrical charge of a system associated electrode(s) caused by the presence of a person's hand. Further, the computing device is configured to control a signaling device so as to wirelessly communicate in response to determining the proximity or contact position of a person's hand in relation to a select monitored object or space.

In at least one embodiment of the present invention, synergism is provided from a combination of a charge coupled detection system and a monitoring camera system including a first camera for imaging the person whose hand is intruding into the secure monitored space or is in contact with a select monitored object. In an example, the present invention features a low power electronic device and method that monitors the intrusion of a hand into the environment adjacent to, on or within a select object, which may be used as a security monitoring system incorporating an operatively associated digital camera for forensically recording such action and providing real-time imaging at a remote location.

Additionally, a system associated digital camera may include an image recording device. Such recorder may be configured as to provide a forensic image recording of a person's activity by means of a continuous recording of a scene within its field of view in timed segments while subsequently erasing this recorded image segment after a predetermined period of time has elapsed. This function is continual and automatic unless there has then been a system-controlled determination of the presence of all or part of a person's near proximity or contact with a select object or space. Upon the system's detection of the presence of a person or their hand by a detection of change in charge or capacitance by a system associated detection electrode, the system associated video recorder will continue recording while ceasing the automatic deletion of the timed video segment imaging the subject scene immediately preceding detection of such change in charge at the detection electrode. In effect, this configuration will allow archival forensic viewing of the actual action of a person's activity immediately prior to and during their contact with the select monitored object, while precluding the need for viewing endless non-relevant non-event video recorded prior to the proximity or contact event.

The system or method of the present invention is accomplished via a capacitive charge coupling through the process of sensing a change of electrical charge at a monitoring detection of at least one electrode caused by the intrusion of a person's hand in, on, near, or within close proximity to or in contact with a monitored area or select object operatively associated with such a detection electrode. That is, the transfer or change of an electrical charge at a detection electrode caused by the presence of a person's hand in contact with or near proximity to a monitoring electrode operatively associated with the area or object of interest. Detection of change of electrical charge of such electrode is accomplished via a capacitance charge controller capable of determining the change in an electrode's electrical properties when altered by a person's hand in the vicinity, which may be by actual physical contact or near physical proximity such as less than about 25 cm, to the monitoring electrode or the select monitored object, when the object is configured to act as a monitoring electrode. The induced electrical changes in charge to the at least one monitoring electrode operatively associated with a monitoring contact or proximity to a select object by the presence of a hand will cause a capacitive charge controller computing device to generate a control signal indicating proximity or contact of a such a person's hand with the select object. Reception of this control signal causes an associated video imaging device to record an event. The recording may be forensic in nature. A digitally visual recording of events preceding the actual detected contact may be combined with the digital visual recording of the specific contact event itself. Additionally, such detection may cause a warning message to appear on a user's remote monitoring device, which may include a Personal Digital Assistant (PDA), phone, iPad, or tablet. The remote monitoring device may include imaging visually reflecting such contact. Concurrently, such a control signal by the charge coupled controller may cause one or more additional controllers to generate a video image to appear on a remote device. This video image may reflect a person's identity through software routines, which may include facial recognition or the like. This video image may also provide graphic representation and recording of the proximity of a person's hand or contact with a select monitored object. This imaging may be wirelessly recorded and forwarded to a remote location for forensic analysis. More specifically, for a system or method of electronically and remotely monitoring and controlling via wireless means, a security monitoring system may include video imaging. This video imaging may be capable of detecting a person's hand in physical contact or in near proximity to a specific system associated monitored object or area. This video imaging may also be capable of wirelessly providing a message, warning, image, or a combination of these to a remotely monitoring device, while providing a means for allowing a visual identification of that person's identity.

Monitoring and controlling the operation and function of a security system for monitoring physical access to select objects may be needed in numerous situations. There is a long felt, but unsolved, need to determine, not only merely the physical presence of a person in totality in proximity to a select object or area, but also a need to determine more specifically, what that person is doing with their hands in relation to that select object or space.

It may be necessary that a person be given or denied access to a variety of objects or locations based not just on their presence or near total body proximity to a select monitored object, but more specifically to what has been determined to be the relative position of their hand, their hand's proximity, or their hand's activity and contact with that particular object. Upon detection of the proximity of at least one of the person's hands in these circumstances, the system or method may involve the actuation of a remote notification. The remote notification may involve a form of push messaging. The remote notification may also involve either the recording of an image or the activation of an annunciator or actuator based on detecting and monitoring the presence of a person's near proximity to, or contact with, the monitored object.

One embodiment of the capacitive charge security monitoring system may incorporate a camera system. The camera system may comprise (1) a digital camera, (2) an image capturing unit, (3) a communication unit configured to transmit image information captured by the camera system to an external device, and (4) a display terminal configured to display image information captured by the camera system. The display terminal may be configured to display image information captured by the camera system according to the prescribed conditions and image information captured according to the user's instructions.

One example of the type of behavior that may need to be monitored may involve monitoring a person's contact with restricted access items such as a cash register, art, or retail consumer products which may include such items as cameras and phones on public display. Alternately, monitoring an unauthorized person accessing, proximity, or contact with a more specifically personal item such as a weapon or valuable jewelry can be highly regarded in many circumstances. Another example of required monitoring with remote messaging may include the monitoring of a person accessing prescription drugs, alcohol or chemicals located in a domestic or commercial setting thereby indicating compliance or non-compliance with a required protocol. These examples of contact may be augmented with the need for actuation of an annunciator. The annunciator may be either remote or local. The annunciator may also electronically display video images showing the person's presence or the activity of the person. Specifically, the annunciator may display images reflecting the activity of a person's hands. This may be at a location where access by the authorized or non-authorized person should normally be determined for security or monitoring purposes or both. Interference with such monitored and restricted locations within the environment by such person may cause the generation of a remote notification to a remote user. Such notifications may include actuating some form of deterrence to include possible notification from a remote phone or PDA like device, a light, a sound annunciator, or activation of a video recording device.

BRIEF DESCRIPTION OF THE DRAWINGS

The accompanying drawings, which are incorporated in and constitute a part of this specification, illustrate several aspects described below.

DETAILED DESCRIPTION OF THE INVENTION

Figure 1:
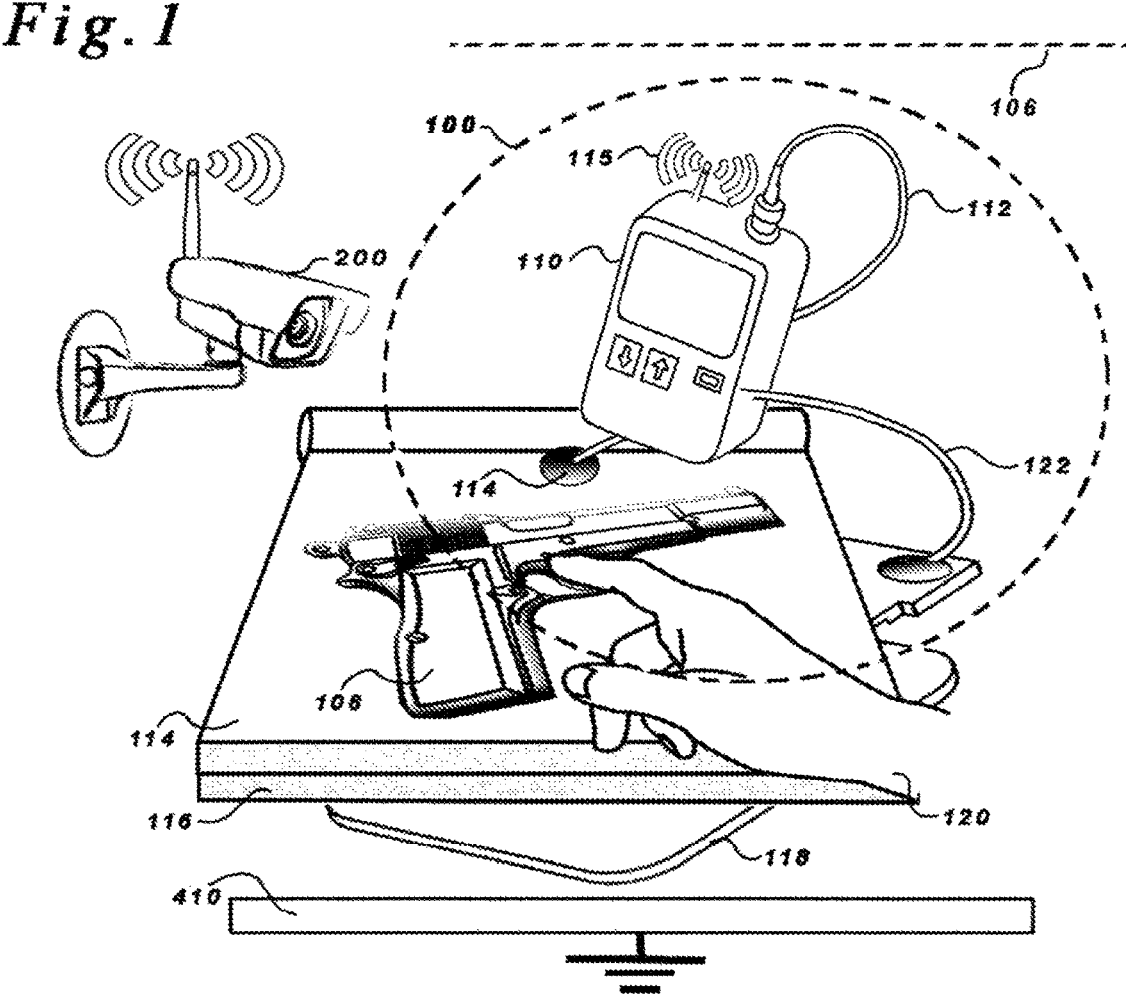
FIG. 1 is a perspective view of a low power security system showing a charge coupled sensor assembly consisting of a charge coupled controller, a detection electrode, and a wireless digital camera in which at least one of the embodiments of the present invention is shown.

It is to be understood that this invention is not limited to any particular-embodiment described, which may vary. Also, it is to be understood that the terminology used herein is for the purpose of describing particular embodiments only, and is not intended to be limiting, since the scope of this invention will be limited only by the appended claims.

In the following detailed description, numerous specific details are set forth in order to explain and provide a thorough understanding of the present invention. However, it is apparent that the present invention may be practiced without some of these specific details. Thus, all illustrations of the drawings are for the purpose of describing versions of the present invention are not intended to limit the scope of the invention.

In the following section, the present invention is described fully by referencing the details in the enclosed drawings, which illustrate certain embodiments of the invention. The numbers shown in this specification refer to the corresponding numbers in the enclosed drawings. The terminology used is to describe the particular embodiment shown and is not intended to limit the scope of the invention. The invention may also be embodied in many other forms in addition to the embodiments shown. Thus, the embodiments shown should not be construed as limiting, but rather, to allow a thorough and complete description of the disclosure that conveys the scope of the invention to a person having ordinary skill in the art in the field of this invention. Therefore, for the terms used herein, the singular forms "the," "a," and "an" are intended to include the plural forms as well as the singular forms, unless the context clearly indicates otherwise. The term "and" includes any and all combinations of one or more of the associated listed items. As used herein, the terms "comprising" and "comprises" when used in this specification, identify specific steps, integers, operations, features, components, and elements, but do not preclude the presence or addition of one or more other steps, operations, features, components, and elements. In addition, the features, components, and elements referenced may be exaggerated for clarity.

Unless otherwise defined, all scientific terms, technical terms, or other terms used herein have the same meaning as the term that is understood by one having ordinary skill in the art in the field of this invention. It is also understood that these terms, including their dictionary meaning, should be understood as having the meaning, which is consistent with their definitions in the related relevant art. In addition, the present disclosure is not to be interpreted in an idealized or overly formal sense unless expressly stated so herein. Constructions or functions that are well known in the art may not be fully described in detail for brevity.

In describing the invention, it is understood that a number of steps and methods may be disclosed. Each of these may have individual benefit. Also, each may be used in conjunction with at least one or more of the disclosed steps and methods. Therefore, this description will refrain from stating each and every possible combination of the individual steps and methods for the sake of brevity. Regardless, the specification and related claims should be understood with the combinations that are entirely within the scope of the claims and inventions.

The disclosure in this invention are examples of how it may be implemented and are not intended to limit the scope of the invention to the specific embodiments shown in the accompanying drawings or the description provided herein. The present invention will now be described by example in the following paragraphs by referencing the accompanying drawings, which represent embodiments and alternative embodiments.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and use the invention.

The method comprises receiving data from a specialized communication device, over a cellular, wireless, satellite, or other network to a special purpose computer with a non-transitory computer readable medium. In one or more of the embodiments, the functions described herein may be implemented in any combination of hardware, software, firmware, etc. The functions may be stored or transmitted as one or more software instructions, computer-executable instructions, or processor-executable instructions, or code on a tangible non-transitory computer readable medium or on a non-transitory processor-readable storage medium, if implemented in software.

The steps of an algorithm, process, or method disclosed herein may be embodied in a processor-executable software module that may reside on a non-transitory computer readable medium. Non-transitory computer readable media comprises computer storage media and communication media including any medium that facilitates transfer of a computer program from one place to another. A non-transitory storage media may be any available media that may be accessed by the special purpose host computer system.

Computer-readable media include both computer storage media and communication media including any medium that facilitates transfer of a computer program from one place to another. A storage media may be any available media that can be accessed by a computer. By way of example, and not limitation, such computer-readable media can comprise Random Access Memory (RAM), Read-Only Memory (ROM), EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. It should be understood in this disclosure that Bluetooth is the same as Bluetooth. The term memory may include volatile or non-volatile (e.g., floppy disks, hard disks, CD-ROMs, flash memory, ROM, and RAM.)

Also, combinations of the above should be included within the scope of non-transitory computer readable medium. In addition, the operations of an algorithm, process, or method may reside as one or any combination or codes, set of codes, instructions, or sets of instructions on a non-transitory machine readable medium or a non-transitory computer readable medium, which may be incorporated into a computer program product. All illustrations of the drawings are for the purpose of describing selected versions of the present invention and are not intended to limit the scope of the present invention.

The reference to PDA devices within the contents of this text may be considered to include any monitoring device, both portable and fixed, which may include iPads, laptops, monitors and the like.

The foregoing summary, as well as the following detailed description of various embodiments, is better understood when read in conjunction with the appended drawings. For the purposes of illustration, there is shown in the drawings exemplary embodiments. However, the presently disclosed subject matter is not limited to the specific methods and instrumentalities disclosed.

The presently disclosed subject matter is described with specificity to meet statutory requirements. However, the description itself is not intended to limit the scope of this patent application. Rather, the inventor has contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present invention. A computing device may be, for example, a processing circuit for the detection of a change in voltage level or change in measured capacitance across a circuit. In another example, a computing device may be a server or other computer located within a commercial, residential or outdoor environment and communicatively connected to other computing devices (e.g., annunciators, transducers, or computers) for controlling security monitoring. In another example, a computing device may be a mobile computing device such as, for example, but not limited to, a smart phone, a cell phone, a pager, a PDA, a mobile computer with a smart phone client, or the like. In another example, a computing device may be any type of wearable computer, such as a computer with a head-mounted display (HMD). A computing device can also include any type of conventional computer, for example, a laptop computer or a tablet computer. A typical mobile computing device is a wireless data access-enabled device (e.g., an iPhone® smart phone, a BLACK-BERRY® smart phone, a NEXUS ONE™ smart phone, an iPad® device, or the like) that is capable of sending and receiving data in a wireless manner using protocols like the Internet Protocol (IP) and the Wireless Application Protocol (WAP). This allows users to access information via wireless devices, such as smart phones, mobile phones, pagers, two-way radios, communicators, and the like. Wireless data access is supported by many wireless networks, including, but not limited to, CDPD, CDMA, GSM, 4G, 5G, PDC, PHS, TDMA, FLEX, Reflex, ident, TETRA, DECT, DataTAC, Mobitex, EDGE and other 2G, 3G, 4G, 5G and LTE technologies. The wireless data access also operates with the operating system of many handheld devices, including, but not limited to PalmOS, EPOC, FLEXOS, OS/9, JavaOS, iOS, Android, Windows 7, 8, 10, and CE. Typically, these devices use graphical displays and can access the Internet and other communication networks on so-called mini or micro-browsers, which are web browsers with small file sizes that can accommodate the reduced memory constraints of wireless networks. In a representative embodiment, the mobile device may be a cellular telephone or smart phone that operates over 4G/5G, General Packet Radio Services (GPRS), which is a data technology for GSM networks. In addition to a conventional voice communication, a given mobile device can communicate with another such device via many different types of message transfer techniques, including Short Message Service (SMS), Enhanced SMS (EMS), Multi-Media Message (MMS), email WAP, paging, or other known or later-developed wireless data formats. Although many of the examples provided herein are implemented on smart phone, the examples may similarly be implemented on any suitable computing device, such as a computer.

As referred to herein, the term "user interface" is generally a system by which users interact with a computing device. A user interface can include an input for allowing users to manipulate a computing device, which may include an output for allowing the computing device to present information or data that indicates the effects of the user's manipulation, etc. An example of a user interface on a computing device includes a Graphical User Interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user on a computing device for interaction. The display object may be displayed on a display screen of a computing device and may be selected by and interacted with by a user using the user interface. In at least one embodiment, the display of the computing device may be a touch screen, which may display the display icon. The user may depress the area of the display screen where the display icon is displayed for selecting the display icon. In at least one other embodiment, the user may use any other suitable user interface of a computing device, such as a keypad, to select the display icon or display object. For example, the user may use a track ball, pen pointer, or arrow keys for moving a cursor to highlight to select the display object.

FIG. 1 is a perspective view of a low power security system comprising a charge coupled sensor assembly consisting of a charge coupled controller, a detection electrode, a wireless digital camera and a remote monitor, which is not shown. This system is operatively associated with a select monitored object 108, such as a weapon, for detecting and remotely monitoring a person's hand accessing the select monitored object. FIG. 1 also shows proximity and detection components of a security monitoring system 100. These components monitor the physical contact or the near proximity of a person's hand to a select monitored object 108 or the surrounding area. The select monitored object 108 may be a gun. A hand 120 intruding into the surrounding area 106 is also shown. The system 100 comprises a computing device 110, which may be electrically coupled to a detection electrode 114 by an electrical interconnect interface 122. The detection electrode 114 may detect a change in capacitance or electrical charge in response to the positioning of an intruding hand 120 in proximity or contact with a select monitored object 108. As described above, the specialized computing device 110 may comprise hardware, software, firmware, or combinations thereof for implementing the functionality described herein. In at least one embodiment, the computing device 110 may include one or more processors and memory, which may be a non-transitory computer readable medium. The computing device 110 may also be coupled to an electrical ground plane 118 to enhance the computing device's sensitivity for detecting a change in charge of the sensor electrode 114. The ground plane 118 may be appropriate for enhancing a return path to ground enhancing sensitivity to change in charge at the detection electrode 114. In at least one embodiment, the computing device 110 may be configured to detect the proximity of a person's hand 120 relative to a select monitored object 108. This detection may be based upon a change of capacitance or charge sensed at the operatively associated detection electrode 114, which may be caused by the presence of the ground referencing intruding hand 120. In this way, the computing device 110 may determine the position of the hand 120 in relation to the detection electrode 114 and the relationship of the hand to the associated select monitored object 108. The computing device 110 may be further configured to generate an activation control signal 115 in response to determining a change in capacitance of an electrode 114 reflecting the position of the hand 120 either in contact with a detection electrode 114 or within a predetermined area or distance from the detection electrode 114. The computing device 110 may also be configured to transmit a control signal to an annunciator, which is not shown in FIG. 1. In at least one embodiment, the resting, storage or containment area for the select item 108 may contain more than one detection electrode 114. In at least one other embodiment, the computing device 110 may be configured to detect either proximity, contact, or both with the select item 108 itself. This embodiment may be used when the select item is configured to act as a system associated electrode that is directly electrically associated with a capacitive charge controller 110.

In at least one other embodiment, in reference to FIG. 1, the computing device 110 and electrode 114 may be configured to sense an approximate position of the hand 120, and whether the hand 120 is either in contact with, in close proximity to, or in the immediate area 106 of the specific monitored object 108. The term "close proximity" immediate area and vicinity may be defined as being 25 centimeters or less from the specific object 108, area 106, the detection electrode 114, or an assembly of electrodes, which is not shown in FIG. 1. When a conductive object, such as a person's hand 120, comes into close proximity to, or in contact with, a detection electrode 114 associated with the computing device 110; the local electrostatic field surrounding the detection electrode 114 is distorted or altered. This distortion is a measurable change in the capacitance or charge at the detection electrode 114 as determined by controller 110.

With continued reference to FIG. 1, the detection electrode 114 may be positioned as a pad. The pad may contain at least one electrically conductive electrode, surface, or coating in electrical communication with a computing device 110 that is placed in direct contact or close proximity to the object 108 being monitored. Monitored objects associated with a security monitoring system 100 are not ordinarily of interest from a security monitoring point of view unless actually touched or in close proximity to an intruding hand 120. The capacitance or electrical charge of the object associated detection electrode 114, when not being intruded upon by hand 120, is first measured to obtain its operative capacitance or charge level and then stored in the memory of the processor. Any large variations between this measured reference capacitance or charge and the capacitance or voltage as determined thereafter by the controller are considered indicative of a hand's proximity or contact with the monitoring electrode, and therefore by direct association, the hands relation to the monitored object 108. The predetermined distance for the proximity indication may be defined by a range of acceptable values. In at least one embodiment, the device 110 may communicate a control signal if the charge value is either above this range or below this range. In at least one other embodiment, the detection electrode 114 may be collocated in the computing device 110 and configured to be either physically or electrically associated with the controller. In yet one other embodiment, the monitoring may be accomplished by means other than contact or proximity with the monitoring electrode as described above. For example, the detection electrode 114 associated with the computing device may be placed in front, in back of above as well as below the monitored object 108. Alternately, the electrode may be physically in contact with or may include actual incorporation into the monitored object itself by electrical interconnect interface 122. As shown in FIG. 1, provisions for enhancing detection of contact and proximity by controller 110 may be provided by a ground plane reference 118, electrically isolated from detection electrode 114, which is in direct or indirect contact with an earth ground 410. One embodiment of the incorporation of a monitoring camera system 200 into security monitoring system 100 is provided with a camera system serving as an image capturing unit; a communication unit configured to transmit image information captured by the camera system to an external device; and a display terminal configured to display image information captured by the camera system. The display terminal being configured to display at least either of image information captured by the camera system according to prescribed conditions or image information captured according to user instructions. Also, shown in FIG. 1 is the associated electrically insulating layer 116, and the detection electrode connection 112. By coupling the electrode connection 112 to the electrode sensor 114 and coupling ground plate 118 to charge controller 110 via electrode connection 122, a ground node may be formed with the surrounding area 410.

Figure 2:
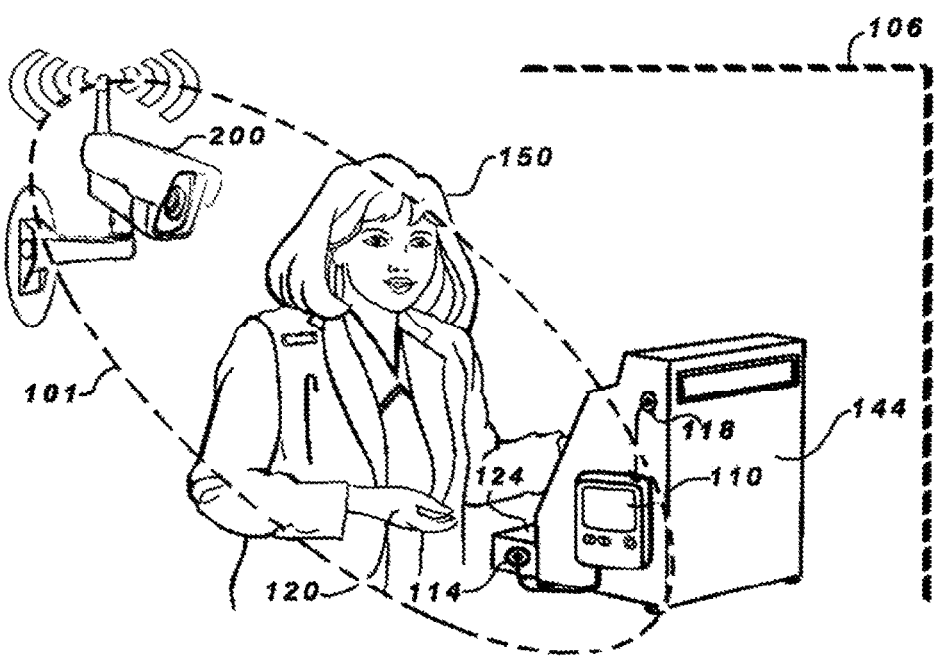
FIG. 2 is perspective view of a security system showing a charge coupled sensor assembly associated with a person's contact with a cash drawer in a business consisting of a wireless charge coupled controller, detection electrode, and a wireless digital camera in which at least one of the embodiments of the present invention is shown.

FIG. 2 is perspective view of a security system comprising a charge coupled sensor assembly consisting of a wireless charge coupled controller, detection electrode, a wireless digital camera and a remote monitor (not shown). The system is operatively associated with a cash register and configured to initially monitor and image a person 150 or a person's hand 120 primarily when in contact with a cash drawer at a cash register. FIG. 2 shows a security monitoring system 101 comprising a charge coupled sensor assembly consisting of a wireless charge coupled controller 110, detection electrode 114, a recording wireless digital camera system 200 viewing the scene that includes the cash register and the person accessing the cash register 144 or more specifically cash drawer 124 and a remote monitor (not shown). The security monitoring system 101 is operatively associated with a cash register and configured to initially monitor and image a person or a person's hand primarily when in contact with a cash drawer at a cash register. In at least one embodiment, the system 101 incorporates a video camera system 200 configured so it will image a person or their hand when that persons hand is moved into an area of interest generally surrounding an object of interest.

The camera's location is configured to track the presence and proximity of a person 150 in relation to a select object 124 within the area shown in FIG. 2, which includes a viewed scene showing a person of interest 150, a monitored object 144, an area or region of interest 106, a digital imaging camera 200 situated to effectively view the scene, an illustrative object of interest, such as a cash drawer 124, an illustrative area of interest area around cash register, an electrode 114 functionally associated with an object of interest such as a cash drawer, a capacitive charge controller 110 reactive to a change of capacitance or a charge at electrodes 114 associated with an object and area of interest, a coupling ground plate 118, and an illumination source (not shown) all comprising a security monitoring system 100. A charge transfer sensor electrode 114 and a cooperating charge transfer controller in computing device 110 are integrated into the security monitoring system for detecting a subject person's hands contact or near contact with the cash drawer. Upon automatic determination of such hand contact, the controller will generate a control signal causing the camera system 200 to initiate a visual recording of such an event, while optionally providing a notification to a remote monitor. Additionally, forensic imaging may be accomplished via camera activation prior to, but directly associated with, afore mentioned hand contact with the cash register or cash drawer according to one embodiment of the present invention.

Figure 3:
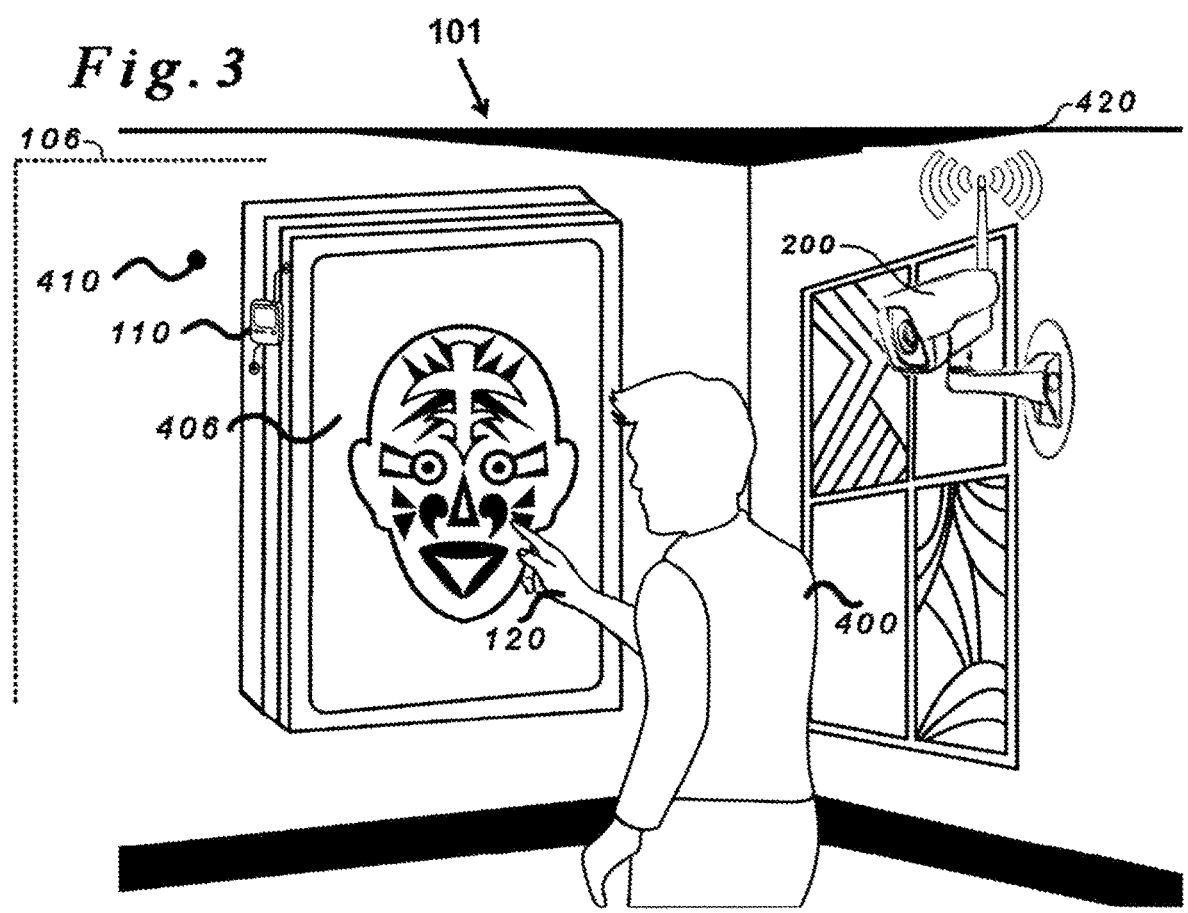
FIG. 3 is a perspective view showing another example utilizing a charge coupled security system for remotely detecting and monitoring the hand of a person in contact or near proximity with a select monitored object in a public or retail environment in which contact is to be monitored or avoided demonstrating in which at least one of the embodiments of the present invention is shown.

FIG. 3 is a perspective view showing another example utilizing a charge coupled security system for remotely detecting and monitoring a person's hand contact or near proximity with a select monitored object (object d'art) in a public environment utilizing the charge transfer effects of that person's hand being within close proximity to a capacitive charge detection electrode directly and capacitive charge coupled controller associated with monitoring that object. Shown is a wireless charge coupled sensor assembly operatively associated with a select object, such as a picture, and a remote monitor (not shown). This indicates hand contact or hand proximity utilizing capacitive charge transfer. FIG. 3 also shows a perspective view showing an example charge coupled security system 100 for monitoring a person's or a patron's 400 contact or near proximity to a public display item 406 in an area of interest such as an art gallery 420. In this way, contact or near proximity by a person's hand 120 to such art 406 is to be precluded by security protocol. The components of monitoring system 100 as illustrated in this figure serve to exemplify an art display as might be found in a museum or art gallery. The patron's 400 illustrated hand 120 is shown to be in physical contact and in violation of security protocol with artwork 406 representative of a select monitored object being publicly displayed on a gallery wall 410. The area or region of interest 106 and a digital imaging camera 200 is also shown in FIG. 3.

Figure 4:
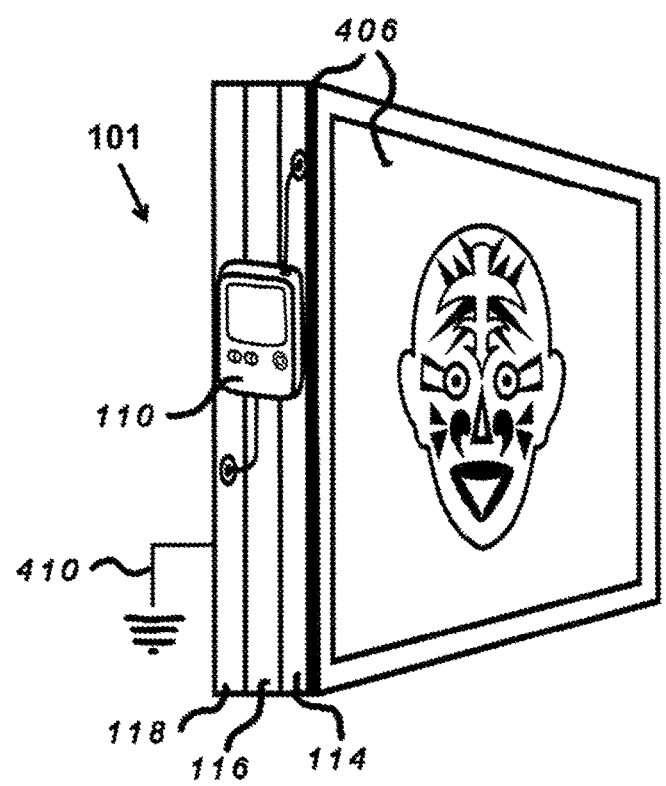
FIG. 4 is a detail illustration of a side view of FIG. 3 demonstrating a wireless charge coupled proximity sensor assembly associated with a detection electrode in near contact with a select monitored object, such as a picture or painting, for the express purpose of detection of proximity or contact of a person's hand with the select object in which at least one of the embodiments of the present invention is shown.

FIG. 4 shows the illustrated artwork's associated computing device 110 in either direct or indirect association with the electrically conductive surface of monitoring electrode 114 that may be removably secured and is directly affixed to the backside of artwork 406. Monitoring electrode 114 is configured to be in close physical proximity to the front or rear surface of artwork 406 or the picture's frame 406. While working in conjunction with computing device 110, changes to electrical charge of monitoring electrode 114 determined by controller 110, caused by the grounding effect created by the near presence of a hand approximating embedded sensor electrode 114, can thereby effectively determine by inference, the person's hand physical contact or near proximity to the aforementioned monitored artwork 406. The determination of the degree of change in electrical charge or capacitance at monitoring electrode 114 caused by intrusion of one's hand in near proximity to electrode 114 will cause computing device 110 to generate and communicate a wired or wireless control signal, reflecting a hands contact or near proximity, to a remote annunciator, monitor or PDA, thereby providing a remote means of alerting security personnel to such intrusion while optionally activating an associated PTZ monitoring camera system 200 as previously shown forming a camera monitoring system as shown in FIG. 3.

FIG. 4 is a detail illustration of FIG. 3 demonstrating a wireless charge coupled proximity sensor assembly associated with a detection electrode in near contact with a select monitored object (picture) for the express purpose of detection of proximity or contact of that person's hand with the select object. FIG. 4 is a cut-away view indicating the mechanical and electrical configuration of monitored artwork 406, monitoring electrode 114, electrically conductive ground plane 118 and the associated electrically insulating layer 116 operatively isolating monitoring electrode layer 114 from ground plane 118. It should be appreciated that the electrical ground plane (an electrically conductive layer) 118 shown may be in physical and/or electrostatic contact with the illustrated mounting surface (wall) 410 thereby enhancing the electrical grounding of controller 110 and subsequently increasing its sensitivity for detecting a change in capacitance or charge at electrode 114 caused by proximity of a patron 400 hand 120. Alternately, the charge controller's 110 ground reference may be connected directly to an alternate electrical ground reference point if conditions permit.

Figure 5:
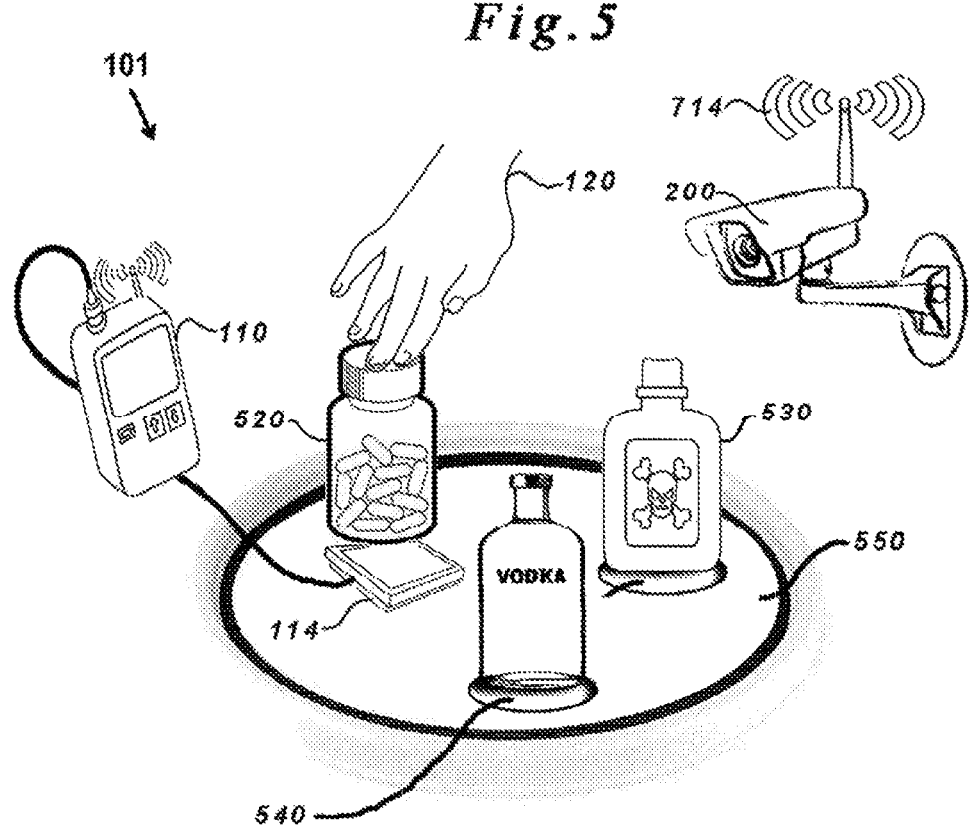
FIG. 5 is a perspective view showing another example of a system including a charge coupled computing device and security imaging system comprising the electronic components of monitoring system and a storage container holding prescription drugs or restricted items for the purpose of remotely monitoring contact or proximity of a person's hands to at least one select object in which at least one of the embodiments of the present invention is shown.

FIG. 5 is a perspective view showing another example of a system including a computing device and security imaging system comprising the electronic components of monitoring system 101 consisting of a sensor electrode, charge coupled controller and a digital recording camera in communication with a remote annunciator (not shown) and a storage container holding prescription drugs or restricted items for the purpose of remotely monitoring contact or proximity of a person's hands to such select object(s) according to one embodiment of the present invention.

Figure 7:
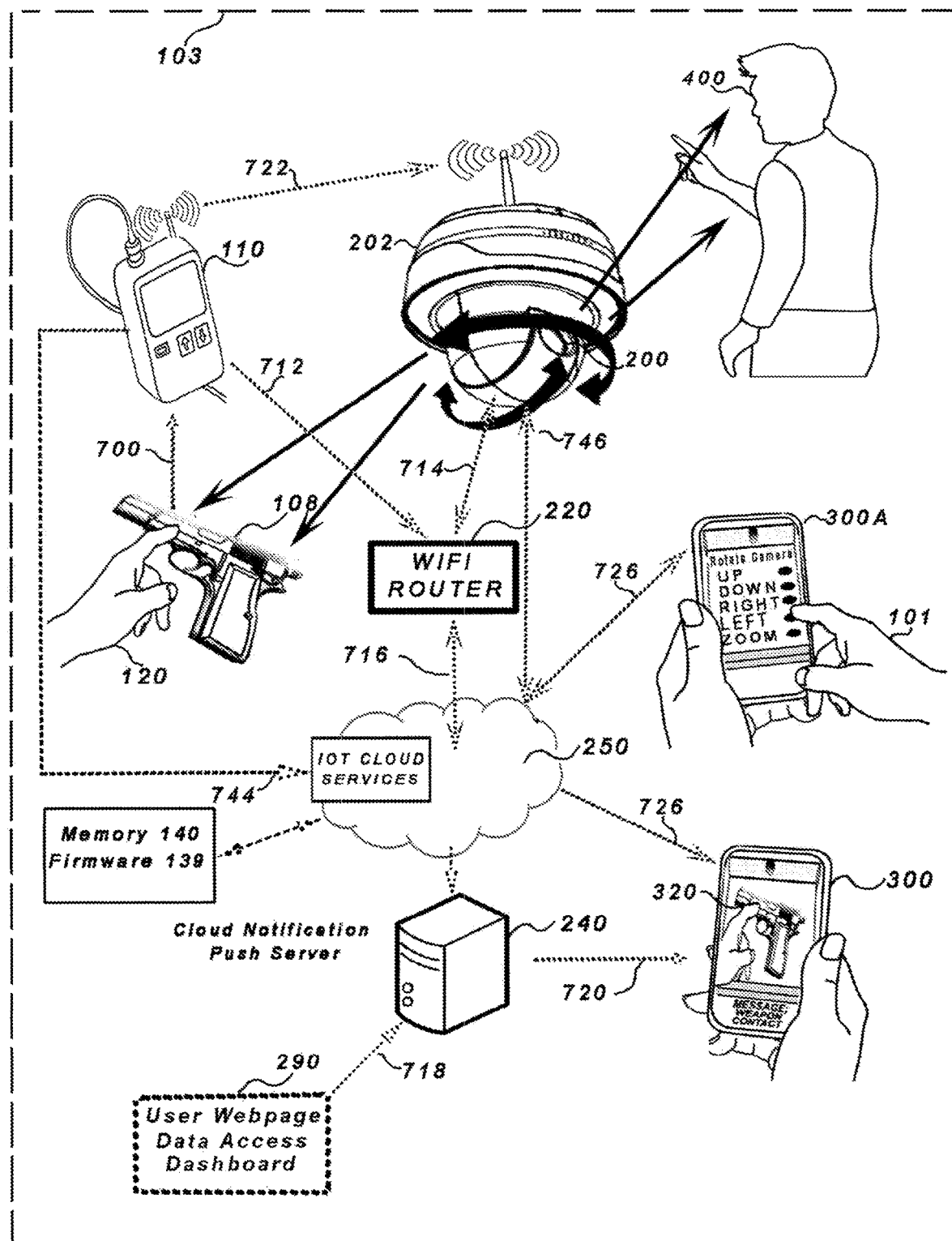
FIG. 7 is a diagrammatic illustration showing a monitoring system comprising a charge wireless charge coupled sensor assembly operatively associated with a wireless video imaging security system incorporating a Pan-Tilt-Zoom (PTZ) mechanism utilizing a wireless communication process including a charge coupled electrode and controller, a digital imaging camera, a router and a cloud based service as an Internet Of Things (IOT) communicating interface between a charge coupled transfer controller and an end user's PDA or similar monitoring device in which at least one of the embodiments of the present invention is shown.

FIG. 5 represents another example of the electronic components of monitoring system 101 incorporating a capacitive charge coupled computing device 110, a detection electrode 114 and an imaging system 200 in wireless communication with PDA/Monitor 300 as shown in FIG. 7, for the purpose of remotely monitoring and detecting hand contact 120 or removal of pill container 520 holding prescription drugs or alternate containers to include poison 530 or alcohol 540 whose contents may require remote monitoring or restricting a person's access to as shown in FIG. 5. According to one embodiment of the present invention, as shown in FIG. 5 the hand contact or proximity of a person's hands to a select container with restricted contents may be monitored through capacitive changes caused by detecting proximity of a hand 120 or a change in a container's proximity with a detection electrode 114. Also, as shown in FIG. 5 is communication signal 714 and ground plane 550.

As shown in FIG. 5, the change to the capacitance of the detection electrode 114 in cooperation with ground plane 550 caused by either proximity of a person's hand or the change in capacitance at detection electrode 540 caused by the displacement of the containers electrically conductive strip, will cause capacitive charge controller 110 to generate a control signal reflecting such a change. The generation of this control signal in turn will cause activation of imaging system 200 thereby enabling imaging system to capture an image of the scene associated with such action and concurrently forward such imaging to a remote monitoring device 300, as shown in FIG. 7, via communication signal 714 as shown in FIG. 5. Additionally, forensic imaging of any of these activities may be accomplished via retaining and combining a salient segment or interval of pre-programmed video imaging occurring prior to the charge coupled controller's activation of image recording by system associated monitoring camera while viewing the aforementioned hand contact with, or movement of, such containers according to one embodiment of the present invention.

Figure 6:
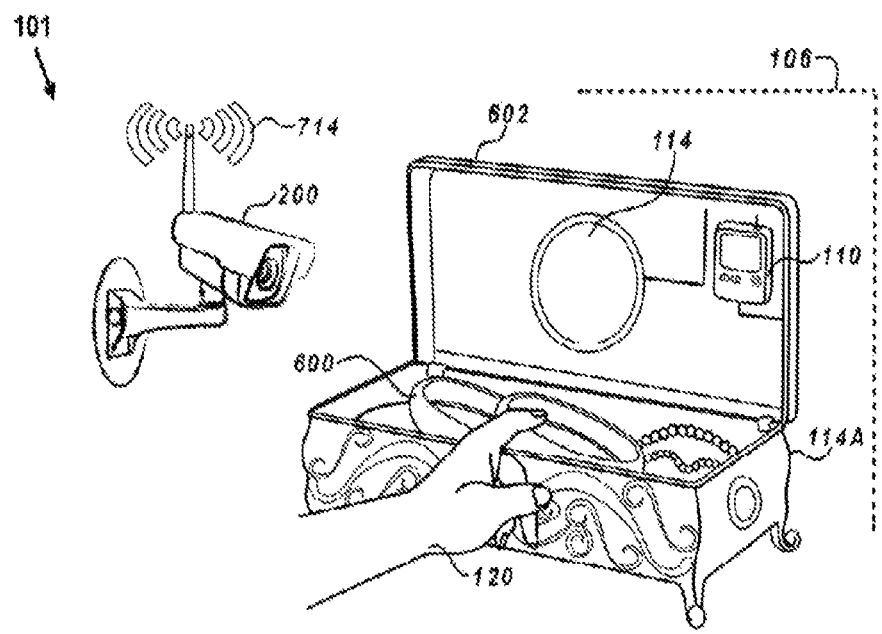
FIG. 6 is a perspective view showing another application of a security monitoring system, illustrating electronic components comprising a monitored storage container holding valuable items for the purpose of remotely monitoring contact or proximity of a person's hands to at least one select object within such monitored container in which at least one of the embodiments of the present invention is shown.
Figure 11:
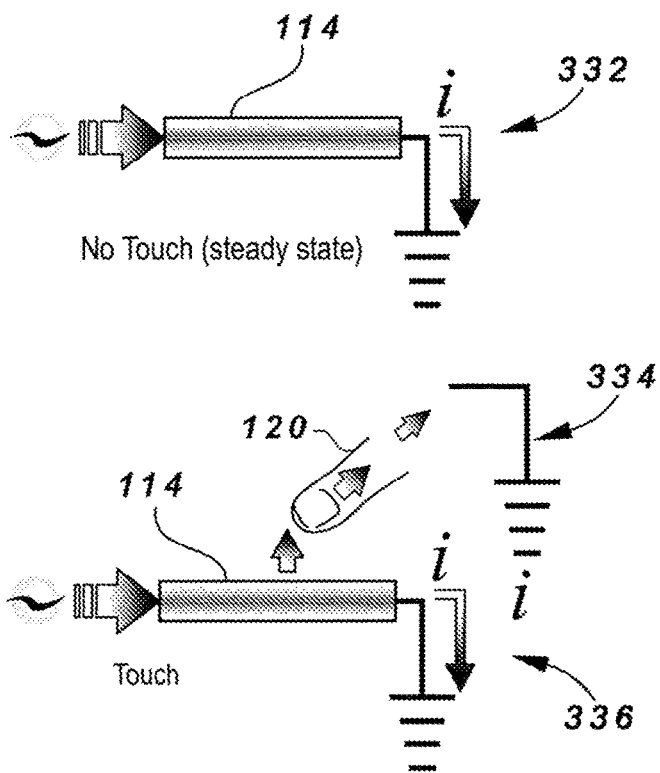
FIG. 11 is a schematic diagram illustrating the charge transfer effects of a person's hand in proximity to a detection electrode associated with a self-charge coupled sensor electrode in which at least one of the embodiments of the present invention is shown.
Figure 12:
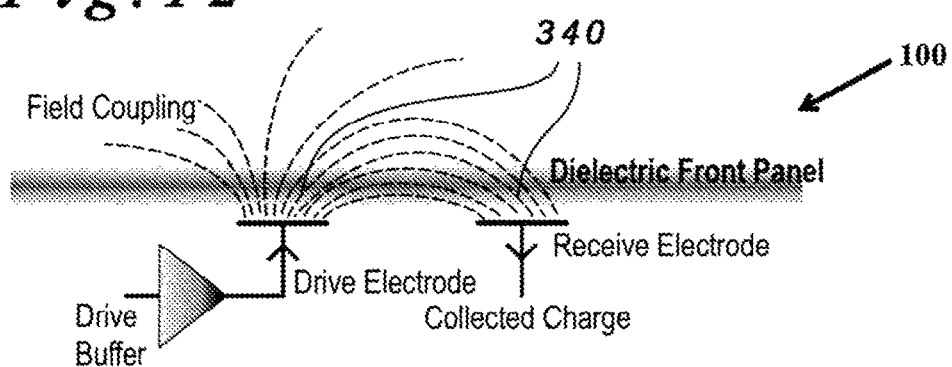
FIG. 12 is an illustration showing an example of the electrical changes induced to mutual or projected detecting capacitive charge detection electrode monitoring the position of an intruding hand. The detection electrode and controller usable with a select object monitoring system caused by the presence of a person's hand in which at least one of the embodiments of the present invention is shown.
Figure 12:
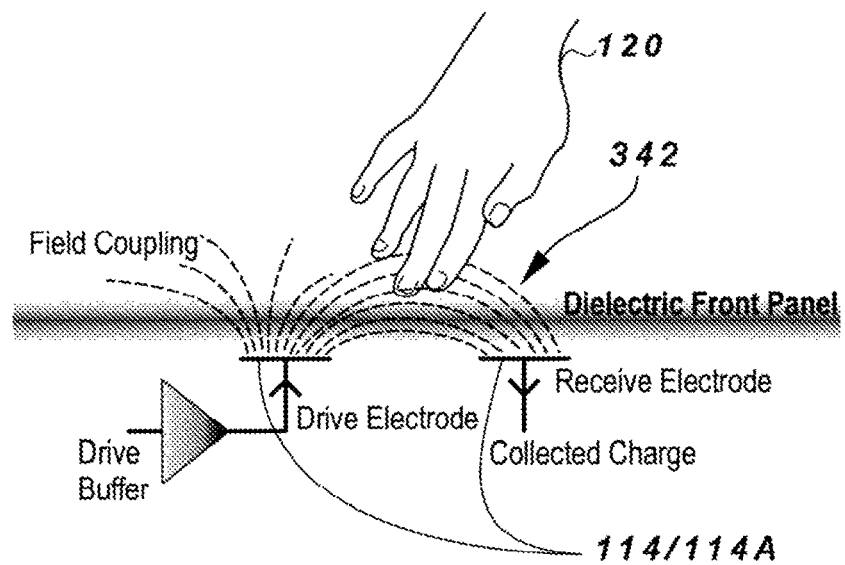

FIG. 6 is a perspective view showing another application of the security monitoring system 101, illustrating those electronic components comprising a monitored storage container holding valuable items or items of interest for the purpose of remotely monitoring contact or proximity of a person's hand to a select objects within such monitored container, according to one embodiment of the present invention, where the security monitoring system includes a capacitive charge controller, an electrode and an associated imaging camera assembly. As shown in FIG. 6, the electrode 114 may be configured for detection via self 332, as shown in FIG. 11, or mutual capacitive charge detection 340, as shown in FIG. 12. If mutual detection is required for an electrically insulated bottle or container, a small conductive area may be additionally incorporated into the bottom of such container.

FIG. 6 represents another example of the electronic components of monitoring system 100 incorporating a capacitive charge coupled computing device 110, a detection electrode 114, a container configured as an electrically conductive electrode, such as a jewelry box, 114A and an imaging system 200 in wireless communication with a PDA/Monitor 300, as shown in FIG. 7, for the purpose of remotely monitoring and detecting hand proximity or contact 120 with, or the removal of, either contents within such container 600 or the container itself 602 whose contents may require remote monitoring of, or restricting a person's access to such contents, and whether the hand 120 is either in contact with and/or in close proximity to, specific monitored object 600 within monitored area 106. Also, as shown in FIG. 6 is communication signal 714.

As shown in FIG. 6, according to one embodiment of the present invention, hand contact or proximity of a person's hands to a select container with restricted contents may be monitored through capacitive changes caused by hand 120 proximity with detection electrode 114 as illustrated or alternately, as a detection electrode configured as an all or part electrically conductive container 114A. The electrode 114 may be configured for detection via self or mutual detection. The detection of change in charge or capacitance of the detection electrode 114/114A caused by the hand's 120 proximity or contact with as determined by controller 110 will cause capacitive charge controller to generate a control signal indicating such change. Generation of this control signal will cause associated imaging system 200 to capture an image of the scene associated with such activity and concurrently forward such imaging to a remote monitoring device 300 via communication signal 714.

FIG. 7 is a diagrammatic illustration showing a monitoring system comprising a wireless charge coupled controller 110 associated with sensor assembly 114, as shown in FIG. 6, operatively associated with a wireless PTZ video imaging camera 200, as shown in FIG. 7, collectively forming security monitoring system 103. Security system 103 utilizing a wireless communication process including a digital imaging camera 200 is primarily actuated by a charge coupled controller detecting a change in electrical charge at electrode 114, as shown in FIG. 6, caused by proximity or contact by hand 120. The controller is configured to detect a change in electrical charge at an electrode associated with a select monitored object or space. The controller will generate a control signal wirelessly activating a surveillance camera 200 upon determining near proximity or contact an intruding hand 120 with a select monitored object 108. Notification to an end user's PDA 300 or similar monitoring device with a push message or image 320 of this change in electrical charge at the detection electrode is accomplished via charge coupled transfer controller 110 communicating through router 220 or directly communicating with an IOT cloud-based service 250. Alternately, wireless communication between controller 110, camera 200 and user monitor or PDA 300 may be achieved directly through IOT cloud services 250 via communication paths 220 and 726. The association of a charge transfer controller, sensor electrode, processor and a PDA are shown according to various embodiments presented herein. The view illustrating major components of the charge coupled controller and electrode sensor assembly operatively associated with an imaging camera, and major components of a Push Messaging System 240 for remotely communicating the detection and imaging of a person's hand in contact or near proximity with a select illustrative object 108 as shown in FIG. 1, such as a weapon, to a user as determined by contact information provided by a user completed webpage dashboard according to one embodiment of the present invention.

According to embodiments of the present invention, FIG. 7 is a perspective view showing the imaging components of an example security system 103 for communicating with a remote annunciator/controller 300/300A, which may include capability of notification to a monitor or PDA/cell phone like device via a cloud service 250. Incorporating a PTZ capability 202 into monitoring camera 200 may provide a means for automatically re-directing the field of view of the monitoring camera when the camera is not directly viewing the select monitored object or area. Additionally, it is anticipated for monitoring at least one of hand contact and proximity to a select object or area, that a computer routine actuated by a control signal initiated by controller 110 upon determining a hand 120 is in near proximity or in contact with the select monitored object or area as determined by a change in charge at electrode 114, as shown in FIG. 6, associated with the select object, will cause the generation of a control signal. Receipt of this control signal by the PTZ 202 will cause an automatic actuation of the PTZ feature, thereby re-directing surveillance camera 200 field of view from its previous orientation viewing an area or location including one that may include suspect individual 400, to a specific pre-programmed orientation so as to enhance the camera's field of view to directly observe the scene associated with monitored object 108 or monitored area. The use of a remote camera controller routine 300A on PDA 300 or a like device for remotely controlling the movement and mechanizations of the PTZ camera aiming device 202 and thereby the field of view of camera 200 provides a means for user 101 to enhance their field of view of surrounding areas to include not only the subject's hand, but alternately, an image of the entirety of the person themselves, thereby aiding identification of the monitored individual.

One or more embodiments of the exemplary system and method may further include alerting the user 101 of the security monitoring system 103 of a violator's hand 120 intrusion as determined by proximity to or contact with the monitored select object 108 and subsequently providing a means of enhancing the remote viewing of the violator's collective behavior and the actions of the violator's hand proximity or contact with that select monitored object.

As another example of an alternate configuration of the monitoring system 103, the sensor electrode 114 (not shown) associated with the select object 108 is in direct communication 700 with the computing device 110 and may be operatively coupled to an imaging device 200 via a control signal 712 as a means of remotely monitoring activities related to a specific object 108 and the specific object's immediate area 106 associated with the monitoring system 103. Activation of computing device 110 as caused by determining the proximity of a hand or contact in the vicinity with a select object 108 and its associated detection electrode 114 may cause the generation of indirect control signal 714 via router 220 and signal 712 or the generation of direct control signal 722 activating imaging device 200 and associated PTZ mechanism 202. Receipt of control signal 722 or signal 714 by camera 200 and PTZ assembly 202 may cause the forensic recording of an image within view of the camera to be recorded and stored in cloud service 250. This imaging may be referenced, viewed and recorded directly or indirectly by a remote device 300. In this application of the invention the term "forensic recording" is used to describe the activation of camera 200 by computing device 110 viewing that person belonging to an intrusive hand 120 upon determination of that person's hand in near proximity to the select monitored object. This configuration provides the capability of system 100 to anticipate and visually capture the actual event of physical contact of a hand 120 with the select object in its entirety to include moments that precede actual hand contact with the select monitored object. Alternately, a Passive Infrared sensor (PIR) sensor (not shown) or image processing software (not shown) may be used to non-selectively activate imaging camera 200 when that person is in near proximity with monitored object or area.

As shown in FIG. 7, control signal 712 generated by activation of computing device 110 causing the generation of control signal 744 and concomitant digital imaging 746 generated by activation of camera 200 viewing select object in viewing area 106 may wirelessly communicate with annunciator/PDA 300 via signal 720 directly via a cloud based (GSM/4G/5G or the like) or a cloud notification push server 240 communication arrangement working with a user webpage data access dashboard or both. Alternately, the communication channel may include an IOT router 220. The router receives control signal 712 from controller 110 and imaging signal 714 from camera 200. This information is forwarded through a link 716 to the cloud 250 accessed by a remote monitor either indirectly via signal 720 through push server 240 or directly from the cloud or web backbone via signal 726 or an indirect access to through signal 720 originating from cloud notification push server 240 communication arrangement working with a user webpage data access dashboard 290 via communication link 718. Alternately, direct wired or wireless communication, to include Wi-Fi, between computing device 110, camera 200 and annunciator 300 may be utilized and is anticipated.

As depicted in FIG. 7, provided within security monitoring system 100 is a capacitive charge coupled proximity controller 110 in wireless communication with a remote central data server 240 capable of providing remote alerts to a fixed or portable monitoring device via a wireless cloud connection. These alerts comprise audible or visual announcements indicating a subject person's contact or proximity to a select monitored areas or object's functionally associated with a sensor detection electrode. Contact may be defined as direct physical contact with, or near presence to, the sensor electrode as caused by a person being within about 2.5 cm or less of such sensor while near proximity to an electrode may be defined as a distance between the subject person's hand (or person's physical parts thereof) being about 30 cm or less. The changes in electrical charge at the electrode caused by proximity or contact of a subject's hand, as determined by the capacitive charge controller, provides a means for specifically determining when a person's hands near presence or actually contact with such electrode and by inferred association, the select object or area being monitored while visually monitoring the entirety of the actions of that subject person of interest.

The subject person 150 may be detected by at least one of the associated imaging camera assemblies 200 when entering monitored area referred to as the scene 106. According to requirements for effective surveillance of the select area or object, different imaging cameras may incorporate infrared or thermal capabilities as well as different fields of view and viewing ranges as deemed appropriate. The camera assembly 200 may communicate with a Wi-Fi access point 220 through signal 714 and a web backbone 250 to a server 240 through cloud service 250, which is ultimately forwarded to an associated remote computing device 300, thereby alerting the user with a push message or image 320. Alternately, the camera 200 and capacitive charge controller 110 may bi-directionally communicate with the cloud services 250 via GSM, 4G-5G communication 744, 746 thereby bypassing potential security concerns with reliability of Wi-Fi services. Device 300 may also concurrently communicate bi-directionally with video camera 200 via communication link 726, 716, and 714 so as to provide in addition to live streaming video information viewed in scene 106 a means for the user via indirect communication with remote web based server 240 via signal 720 a means of remotely controlling a PTZ function to enhance viewing by the camera system. In addition, subsequent to the person's detected entry into system detection area 106 by camera system 200 and the concomitant generation of control signal 712 by controller 110 upon proximity detection of contact or near proximity of that persons' hand to sensor electrode 114, (in this illustration shown as a gun) imaging system 200 may cause the recording of at least one image to be stored locally or remotely for future forensic reference by operating memory 140 and firmware 139 within cloud service 250. As shown in FIG. 7, an alternate to a Wi-Fi communication pathway is provided by a GSM, 4G/5G link 744 and 746. This alternate method of communication provides a more secure means of data transfer through a direct communication link between capacitive charge controller 110 and cloud notification push server via IOT cloud service 250. Push server 240 in communication with cloud service 250 generates an audio, text, or image message, which is ultimately forwarded to an associated remote computing device 300 via data link 720 thereby alerting the user with a push message 320. Additionally, it should be appreciated that in consideration of the specific needs for the surveillance of the select areas or objects of interest by capacitive charge sensor electrodes and a charge controller, that video cameras and video recordings may not be required for that particular intended application and may not be present and may not be incorporated into particular iteration of monitoring system 100.

In at least one embodiment, the system 103 incorporates a video camera system 200 configured so it will detect a person who moves into an area of interest 106 generally surrounding the object of interest. The location of the camera is configured to visually track the presence and proximity of a person 150 in relation to a select object 108 within scene area 106 as shown in FIG. 2, includes a viewed scene showing a person of interest 150, a monitored object, an area or region of interest 106, a digital imaging camera 200 situated to effectively view the scene, an illustrative object of interest (cash drawer) 124, an illustrative area of interest (area around cash register) 106, an electrode 114 associated with object of interest (cash drawer), a capacitive charge controller 110 reactive to change of capacitance or charge at electrodes 114 associated with an object and area of interest, an illumination source (not shown) all comprising security monitoring system 100. Charge transfer sensors may be integrated into the aforementioned monitoring system for detecting hand contact or hand vicinity.

Figure 8:
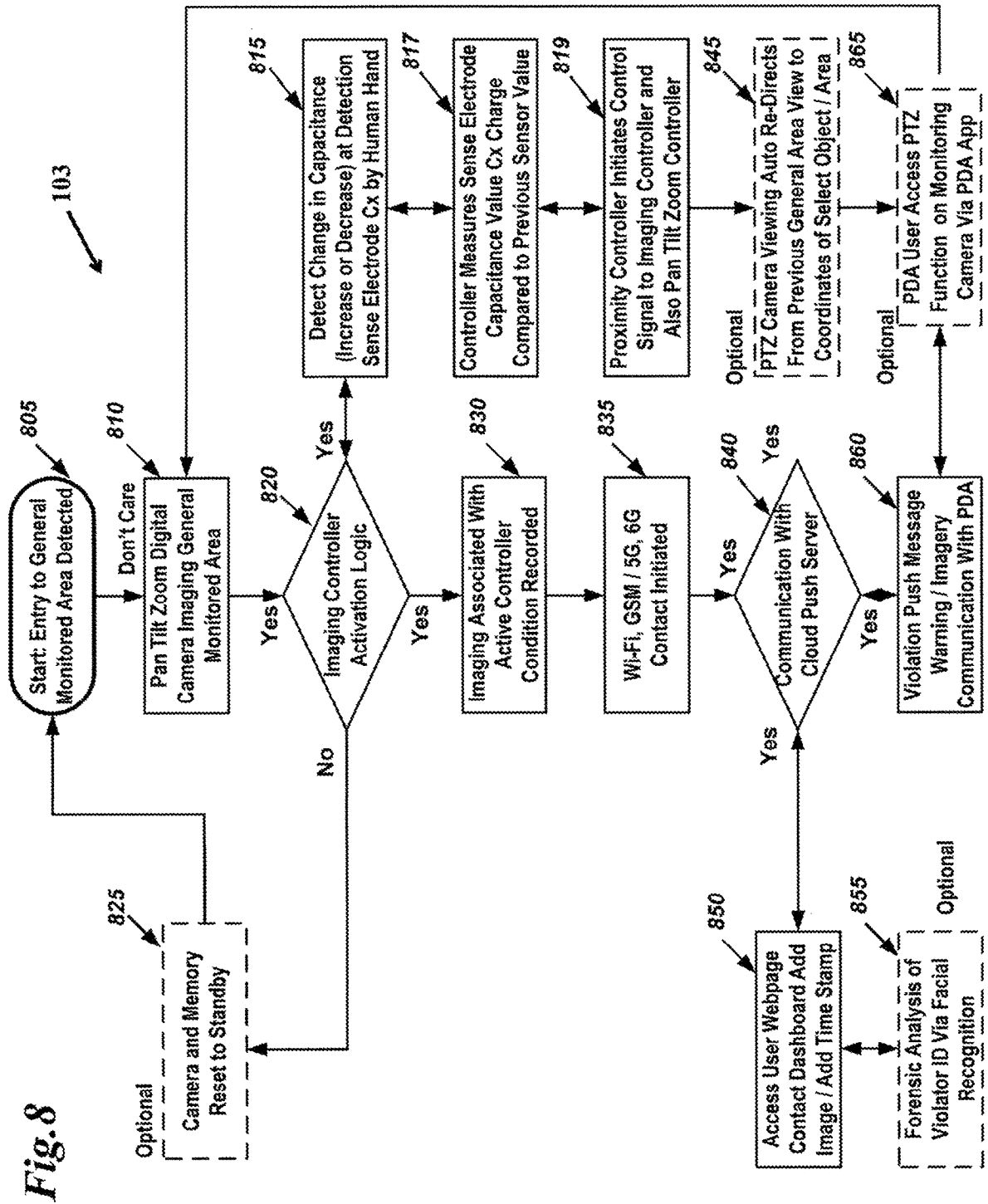
FIG. 8 is a block diagram representing the logic associating electrical changes detected by the capacitive charge detection electrode caused by the detection of the presence of a person's hand with a select monitored object and ultimately messaging an end user's remote access point or PDA, while additionally illustrating the PTZ mechanism for automatically and remotely controlling the field of view of the associated imaging camera in which at least one of the embodiments of the present invention is shown.

FIG. 8 is a block diagram representing the logic associating electrical changes detected by the capacitive charge detection electrode caused by the presence of a person's hand near a select monitored object and messaging an end user of such presence at a remote access point, monitor or PDA upon detection of contact or near proximity by a person to such a select object or area.

FIG. 8 additionally illustrates an optional, more advanced mechanism for use of an automated PTZ mechanism associated with a provided digital imaging camera. This optional capability provides a means of automatically or remotely controlling the field of view of the provided imaging camera so as to monitor both a large general area associated with a select object and subsequently, when required, upon detection of the presence of a person near a select object, automatically or manually re-focus the field of view of such camera onto a narrower field of view encompassing more specifically the select object or area.

As shown in FIG. 8, the block diagram references the logic and actions associated with a security monitoring system 103. The monitoring of a protocol or security violator begins with detection of that person's presence within a monitored area by any one of the aforementioned means for detecting a person's presence 805. The security monitoring video imaging commences irrespective of the means of initiation and activation previously shown, such as PIR, frame change, image recognition etc., and may continue to view an area of interest different, but associated with, the scene in which the monitored object appears 810. Subsequently, determination of physical contact, or very near proximity (for example, less than about 2 cm or less) by the imaged person 120, as shown in FIG. 1, to the select object or area causes a change in electrical charge in the select object or the objects associated monitoring electrodes 815. This change in charge 817 at the monitoring electrode 114, as shown in FIG. 1, causes capacitive charge controller 110, as shown in FIG. 1, to generate a control signal 819 which directly or indirectly causes the immediate image to be captured and permanently stored in memory 830 by camera system 200, as shown in FIG. 1. Concurrently, this control signal may cause the activation of the camera's PTZ mechanism causing the camera to redirect its field of view from its current field of view to an alternate, pre-programmed field of view 845; thereby, encompassing and enhancing imaging of the select monitored object or select area. Alternately, at logic decision point 820, if no control signal is generated by controller 110, as shown in FIG. 1, reflecting contact with the select object or area after a predetermined period of time, the imaging viewed by camera 200, as shown in FIG. 1, currently stored in memory is then removed from camera memory 825, and the camera image recording ceases and the camera detection status is then returned to standby 805.

However, if contact or near proximity to the select object is detected 815, the control signal 712, as shown in FIG. 7, from charge controller 110, as shown in FIG. 1, indicating activation is forwarded along with the cameras captured image of the scene including the intruder and the select object 830 forwarded to a wireless means of communications 835 incorporating a remote cloud push server 840. The Cloud push server 240, as shown in FIG. 7, will forward a push message and images of the scene reflecting that person's actual contact with the select monitored object to a user access point or location 860 as determined by a previously configured user webpage 850. Concurrently, a means for image facial recognition 855 (not shown) of that image of that person captured by imaging camera 200, as shown in FIG. 7, may be provided in the information forwarded to a user's PDA or monitor 860. If provided, the means of software facial recognition 855 may be applied to the imaging capture by camera system 200, as shown in FIG. 7, by system associated software within the camera system directly. Alternately, a system associated program within a cloud-based server may provide the required image processing.

Additionally, the user's PDA or monitor may include a remote manual means 300A, as shown in FIG. 7, or supplement an automatic means 845, for controlling the PTZ functions 865 associated with re-directing the camera's field of view. This capability, controlling the imaging camera so as to control and optimize the cameras field of view, enhances remote viewing by the user while providing a means of more precisely recording the scene of interest in real time.

Figure 9:
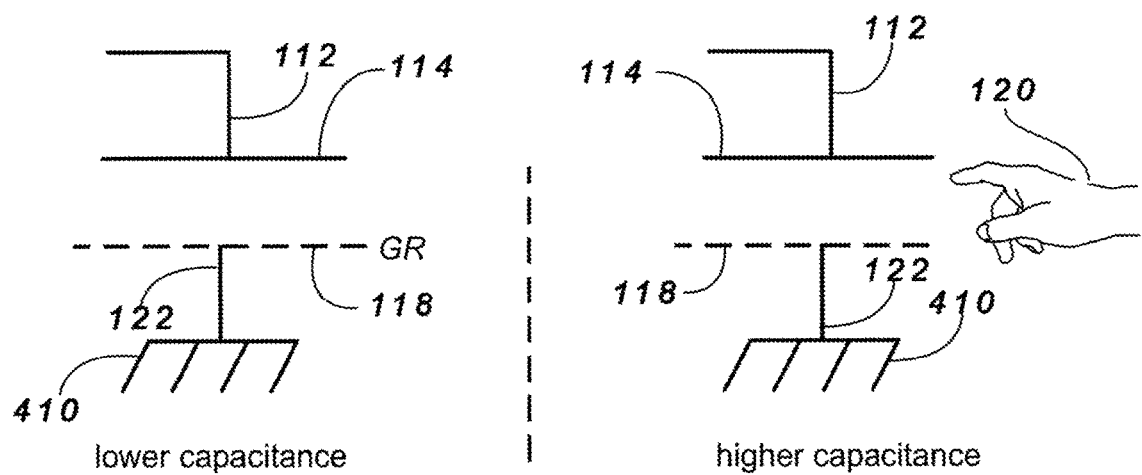
FIG. 9 is a schematic diagram showing an example of an embodiment of a self-capacitance sensed detection electrode detecting the presence of a person's hand and reflecting a change of capacitance charge induced to that detection electrode in which at least one of the embodiments of the present invention is shown.

FIG. 9 is a schematic diagram showing an example of an embodiment of self-capacitance sensed detection electrode, while detecting the presence of a person's hand according to embodiments of the present invention, and reflecting a change of capacitance charge induced to that electrode.

In regards to FIG. 9, the proximity detection functions in such a way that there exists a capacitance between any electrical surface reference point relative to the ground, as long as electrical isolation exists between the reference point and the ground. The detection electrode sensor 114 may be the reference point in an electrically conductive area as shown in FIGS. 1 and 9. The sensing plate 114 may be further coupled to a charge coupled controller 110, as shown in FIG. 1, via detection electrode connection 112. As shown in FIG. 1, by coupling the electrode connection 112 to the electrode sensor 114, and by coupling the ground plate 118 to charge controller 110 via electrode connection 122, a ground node may be formed within the surrounding area 410. As shown in FIG. 9, when the hand 120 is brought into close proximity of about 30 centimeters or less in this exemplary embodiment of the detection electrode sensor 114 an increased coupling between the reference point and the ground occurs. As a result, the capacitance of the electrode sensor 114 and the electrically associated surface area, relative to ground 118 can increase. This capacitance is compared by at least one processor within controller 110 with a reference capacitor whose capacitance or charge may be altered so as to allow adjustment of the systems detection sensitivity threshold. When the intruding hand 120 is physically positioned near electrode sensor 114, the presence of the hand may increase the capacitance between the electrode sensor 114 and the ground electrode 118 as the hand approaches the object associated with the detection electrode 114. The detection electrode may be used in a large number of applications. For example, the electrode sensor 114 may be mounted on a wall or in a mat placed under or around the monitored object as will be discussed below.

Figure 10:
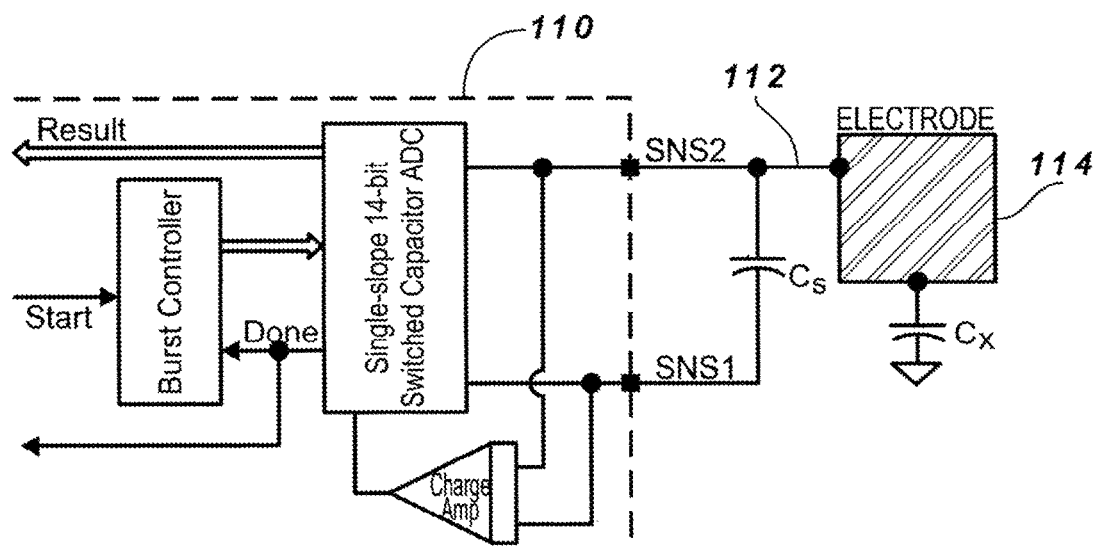
FIG. 10 is a block diagram showing an example of the technical components of a charge transfer controller comprised in the computing device for detecting the change of capacitance or charge in a detection electrode indicating the presence of a person's hand in proximity or contact with an electrode associated with a select object in which at least one of the embodiments of the present invention is shown.

FIG. 10 is a block diagram showing an example of the technical components of a charge transfer controller comprised in the computing device 110 for detecting the presence of a person's hand in proximity or contact with an electrode associated with a select object according to embodiments of the present invention.

With regard to FIG. 10, a block diagram showing an example of a charge transfer controller comprised in the computing device 110 for detecting the intrusive hand 120 is provided according to at least one embodiment of the present invention. Touching or close proximity to the detection electrode 114 can increase the capacitance significantly. To measure a change in the capacitance, the charge transfer controller comprised in the computing device 110 is provided. The charge transfer controller employs a charge transfer method of capacitive sensing. A charge is initially transferred to all of the electrically contiguous parts of the detection electrode 114 via electrical interconnect interface 112, thereby allowing it to function as a capacitor (CX) while a charge is transferred into charge collection reference capacitor (CS) until the voltage on capacitor CS reaches a tripping point.

As described in FIG. 1, a detection electrode 114 comprising an electrically conductive surface area in direct or indirect contact (near proximity) thereby operatively associated with determining contact or near proximity of a hand to the monitored object 108. It should be understood that the monitored object itself may function as the required detection sensor electrode 114 independently when interconnection 112 is in direct electrical contact with an electrically conductive surface inherent in, or imposed upon, the monitored object itself. The electrical interconnect interface 112 and detection electrode 114 associated with the charge transfer controller may be incorporated into the computing device 110. The method of FIG. 10 includes determining the position of a hand based on the measured capacitance or voltage of a charge coupled detection electrode. Continuing the aforementioned example, the charge transfer controller may determine a position of the hand 120 based on the measured capacitance or voltage at electrode 114 as shown in FIG. 1. Further, the method includes controlling a signaling device to communicate a signal in response to determining the position of the hand and its approximation to a system associated sensor electrode 114. The method of FIG. 10 also includes checking for pre-set annunciator settings.

FIG. 11 is a schematic diagram illustrating the charge transfer effects of a person's finger 120 in proximity to a detection electrode associated with a self-charge coupled sensor electrode 114 according to one embodiment of the present invention. Associated with the controller, the assembly measures the capacitance between the sensor electrode and ground. Thus, FIG. 11 shows an example of an embodiment of a capacitance monitored detection sensed via self-capacitance. With continued reference to FIG. 11, self-capacitance uses the at least one processor within charge transfer controller comprised in the computing device 110 to measure the current or electrical charge 332 on each detection electrode 114 to ground and therefore is called "self-capacitance." As the person's finger 120 touches or is near an electrode 114, some of the charge of the electrode 114 is coupled to the finger 120 and is drawn away as current 334 reduces the electrical charge 336 of the electrode 114 detected by the charge transfer controller comprised in computing device 110.

FIG. 12 is an illustration showing an example of the electrical changes induced to mutual or projected detecting capacitive charge detection electrode monitoring the position of an intruding hand 120. The detection electrode and controller usable with a select object monitoring system caused by the presence of a person's hand according to embodiments of the present invention measures the capacitance between the transmitter electrode and the receiver electrode.

FIG. 12 is a schematic diagram showing an example of an embodiment of monitoring system 100 utilizing projected capacitance of detection electrodes 114 and 114A sensed via mutual capacitance according to embodiments of the present invention. Mutual capacitance is the intentional or unintentional capacitance between two "charge holding objects." Mutual capacitance detection electrodes 114 and 114A intentionally create mutual capacitance 340 between a closely approximating pair of electrodes. The mutual capacitance is in the vicinity where the electrodes intersect with the other. This allows the at least one processor within the charge transfer controller comprised in computing device 110 to measure each node (intersection) individually to detect one or more touches on the monitored surface or vicinity of the electrode during one scan of the associated electrodes. As the person's hand 120 touches or is present near an intersection of these electrodes, some of the mutual capacitance between the pair of electrodes 342 is coupled to the hand 120 which reduces the capacitance at the intersection as measured by the charge transfer controller comprised in the computing device 110. This reduced capacitance crosses the "touch threshold" set by the associated computing device indicating a touch or near contact has occurred and causes a control signal to be generated.

Figure 13:
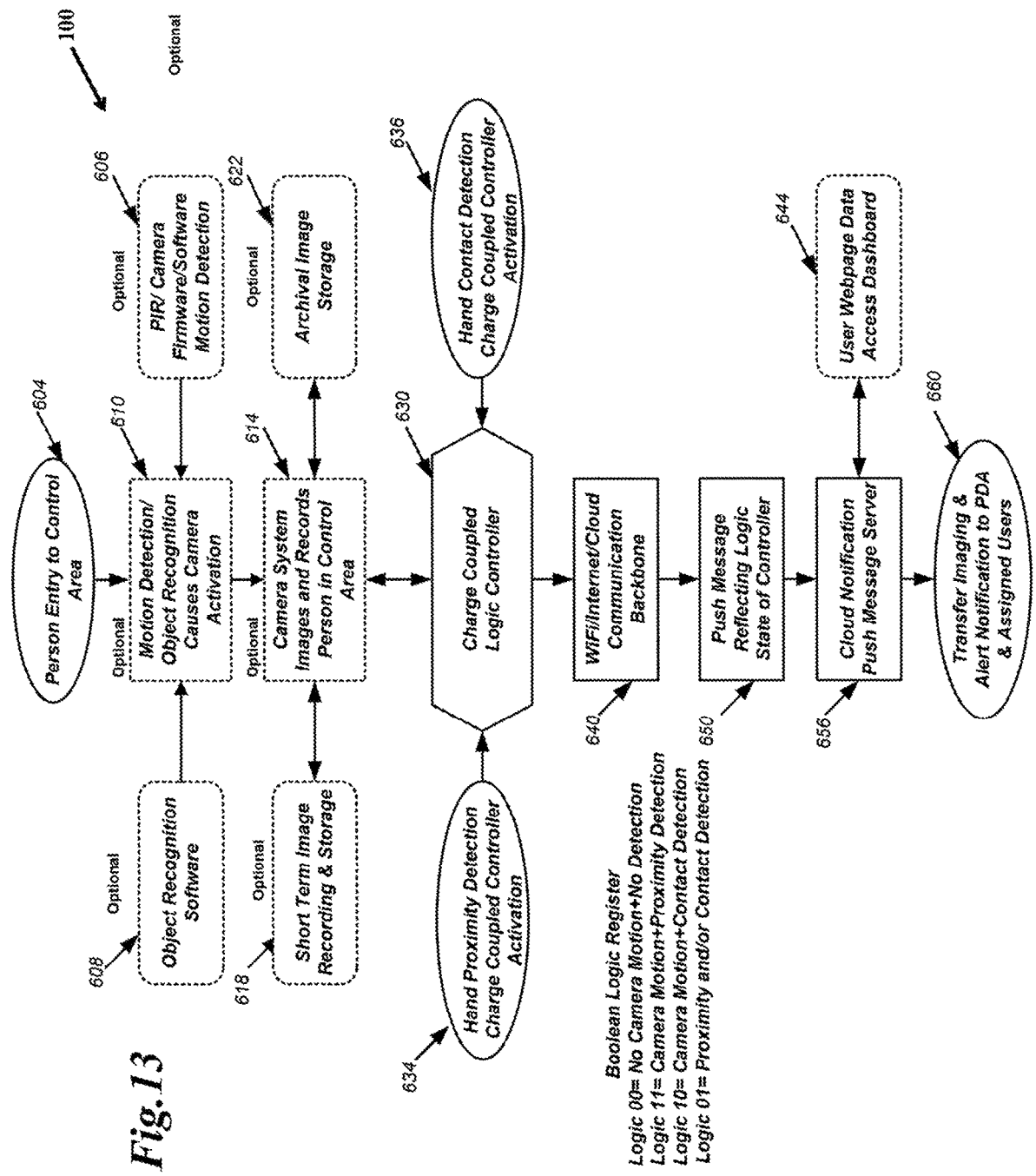
FIG. 13 is a block diagram showing an example of the logic associated with a security system, including optional imaging, for remotely monitoring a select object or select area via the change in capacitance charge detected at a sense electrodes associated with a select monitored area or object in which at least one of the embodiments of the present invention is shown.

FIG. 13 is a block diagram exemplifying the logic associated with a basic charge coupled security monitoring system provided for the purpose of monitoring hand contact or proximity to a select object or area. This monitoring detects the change in electrical charge detected at a sense electrode operatively associated with a capacitive charge controller comprised in the computing device. The computing device incorporates a logic controller for detecting the presence of a person's hand in proximity or contact with an electrode associated with a select object according to at least one embodiment of the present invention. FIG. 13 additionally illustrates the logic associated with an optional, more advanced mechanism for use of an imaging camera system so as to provide video monitoring to a remote user for the purpose of observing the associated proximity and contact events when detected by the monitoring system.

As shown in FIG. 13, the block diagram references the logic and actions associated with security monitoring system 100. The monitoring of a protocol or security violator begins with the optional detection of a person's presence 604 within a monitored area by any one of the aforementioned means for detecting a person's presence 606 or 608 or both causing activation of the camera imaging system 610. Imagery captured by the camera system 614 is retained in either short term memory storage 618 or alternately in long term archival image storage 622 depending on the user's preference.

Logic controller 630 is associated with a charge coupled controller capable of through-putting imagery from camera system 614 via Wi-Fi Internet backbone 640 to user PDA 660, while concurrently reactive to inputs from associated capacitive charge electrodes configured to detect a hand's near proximity 634 or contact 636 with select monitored objects or areas. Alert messaging consisting of specific messages directly reflecting the logic state of the logic controller, along with the provided optional video imaging is forwarded to the users PDA or monitor through a cloud associated Push Message Server 656. The wireless server will provide an alert message 650 corresponding to the logic register within the logic controller (alternately along with imagery from image memory) to the user's PDA or monitor 660 according to a pre-established access protocol controlled by a routine within the system associated user webpage dashboard 644.

Figure 14:
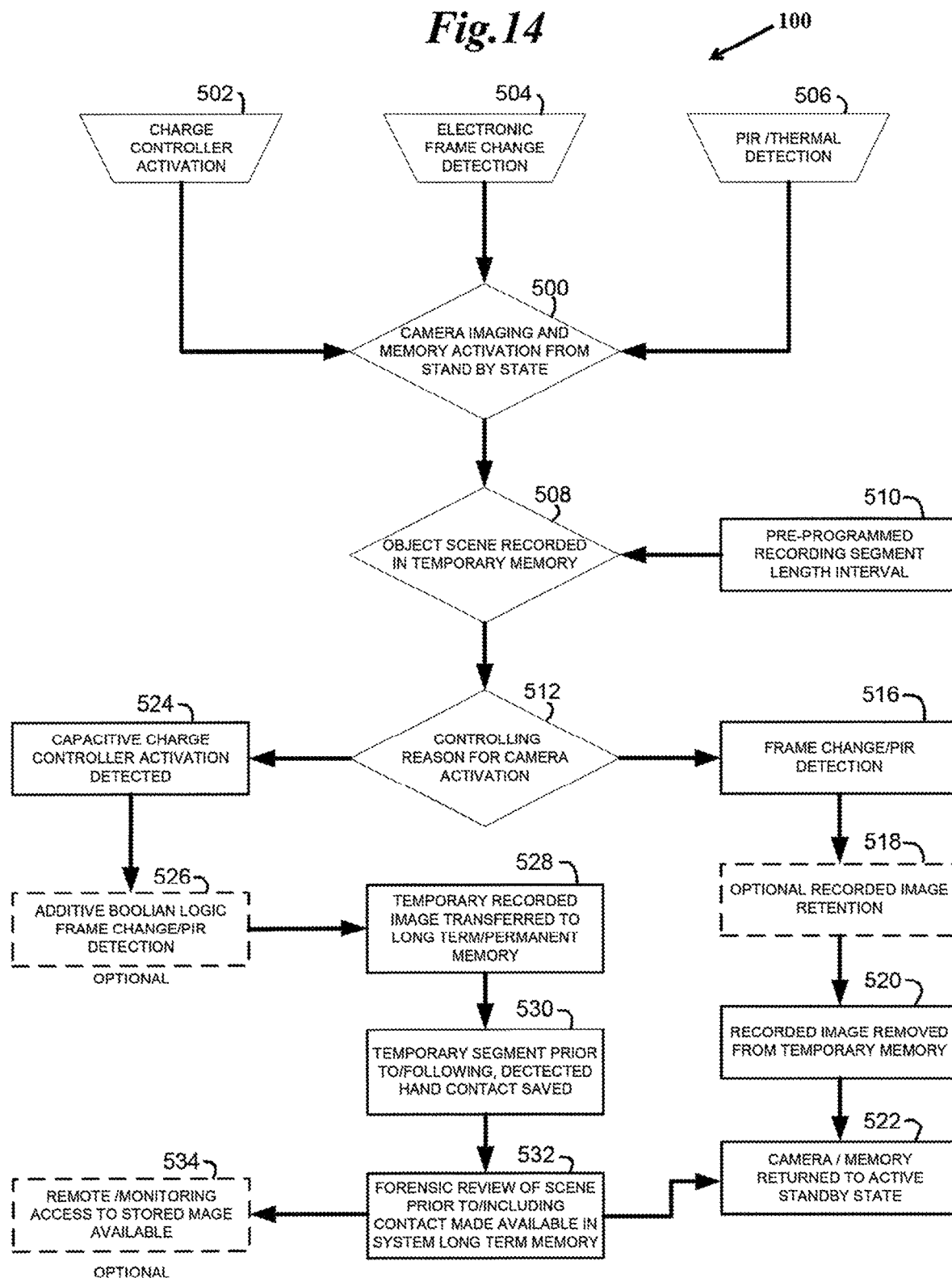
FIG. 14 is a block diagram showing an example of the logic associated with the forensic video recording of a security or protocol violation as determined by activation of a capacitive charge controller comprised in the computing device for detecting hand proximity or contact with a select monitored object or area in which at least one of the embodiments of the present invention is shown.

FIG. 14 is a block diagram showing an example of the logic associated with the forensic video recording of a security violation as determined by activation of a capacitive charge controller comprised in the computing device for detecting hand proximity or contact with a select monitored object or area. The block diagram in FIG. 14 exemplifies the logic associated with security monitoring system 100 incorporating a forensic video recording of a security violation as determined by activation of a capacitive charge controller comprised in the computing device used for detecting hand proximity or contact with a select monitored object or area. Camera activation 500 from a standby (non-recording) state 522 is initiated by a control signal emanating from either one, both, or all signal sources 502, 504, and 506. Upon activation of the monitoring and recording camera, those images of the monitored scene within view of the camera captured by camera system 200, as shown in FIG. 1, are then stored in a temporary addressable memory 508 associated with monitoring camera system 200. A user programmable software routine 510 concurrently associated with memory recorder 508 controls the length and duration of the video recording held in temporary memory per instructions from routine 510. A determination of the final format and the conversion of this recording to a permanent or non-permanent state is controlled by a logic routine 512. Logic routine 512 controls the disposition of the imaging 508 captured in routine 500 by determining the order and sequence of the control signals activating camera system 200. If routine 512 determines that camera activation occurred initially by detection of intrusion into the secure monitored area via PIR, frame change, or similar means, absent detection by capacitive charge controller 524, then logic 516 will cause the temporary imaging of the secure scene 508 to be deleted or erased from memory 520 unless otherwise required 518. Subsequent to this memory erasure of short-term imaging, the monitoring camera system 200 will be returned to a non-recording standby state 522.

In the event that routine 512 determines camera activation occurred initially due to receiving a control signal initiated by charge controller 524, then logic 512 seeks to determine if a subsequent control signal 504 or 506 has been received. The optional Boolean logic 526 of routine 512 provides redundancy in the determination of the near concurrence of both a control signal indicating physical contact or near proximity to the select monitored object 502 and the detection of a person via visual means 504 or 506 has occurred. Determination of this concurrence will then cause the system 100 to transfer temporary image 508 to a retrievable long-term memory 528. Additionally, routine 530 will cause a timed segment or interval of video imaging of the scene 508 preceding the actual detection of physical contact or near proximity with the select monitored object to then accompany the conversion 528 of the now continually recorded scene 508 to a permanently stored video segment imaging the actual event showing the contact or proximity with the select object within a secure location scene 532. This availability of a combination of pre and post contact or security violation imaging will provide a permanent forensic 532 (before actual contact) video record for either local or remote review 534. In this manner, the system or method integrates these components into a specific practical application of determining what occurred immediately prior to the person touching or being in the near vicinity of the object. The video that is saved may be limited to a certain time frame 510, such as about the two minutes prior to or after the person touching or being in the near vicinity of the object. In this way, the claimed system or method improves the operation of the special purpose computer in retaining only the essential video data that is recorded in the time period prior to or after the person touches the object or is in the near vicinity of the object.

As a result, the claims of this invention provide an improvement in the technical field by limiting the amount of total video data to be recorded while allowing data to be uniquely recorded just prior to the contact triggering event. It should be understood, subsequent to camera system 200 imaging and permanently recording security violations as determined in the observed scene for a period as determined by routine 510, camera system 200 is then returned to its non-recording standby state 522 awaiting further re-activation.

Figure 15:
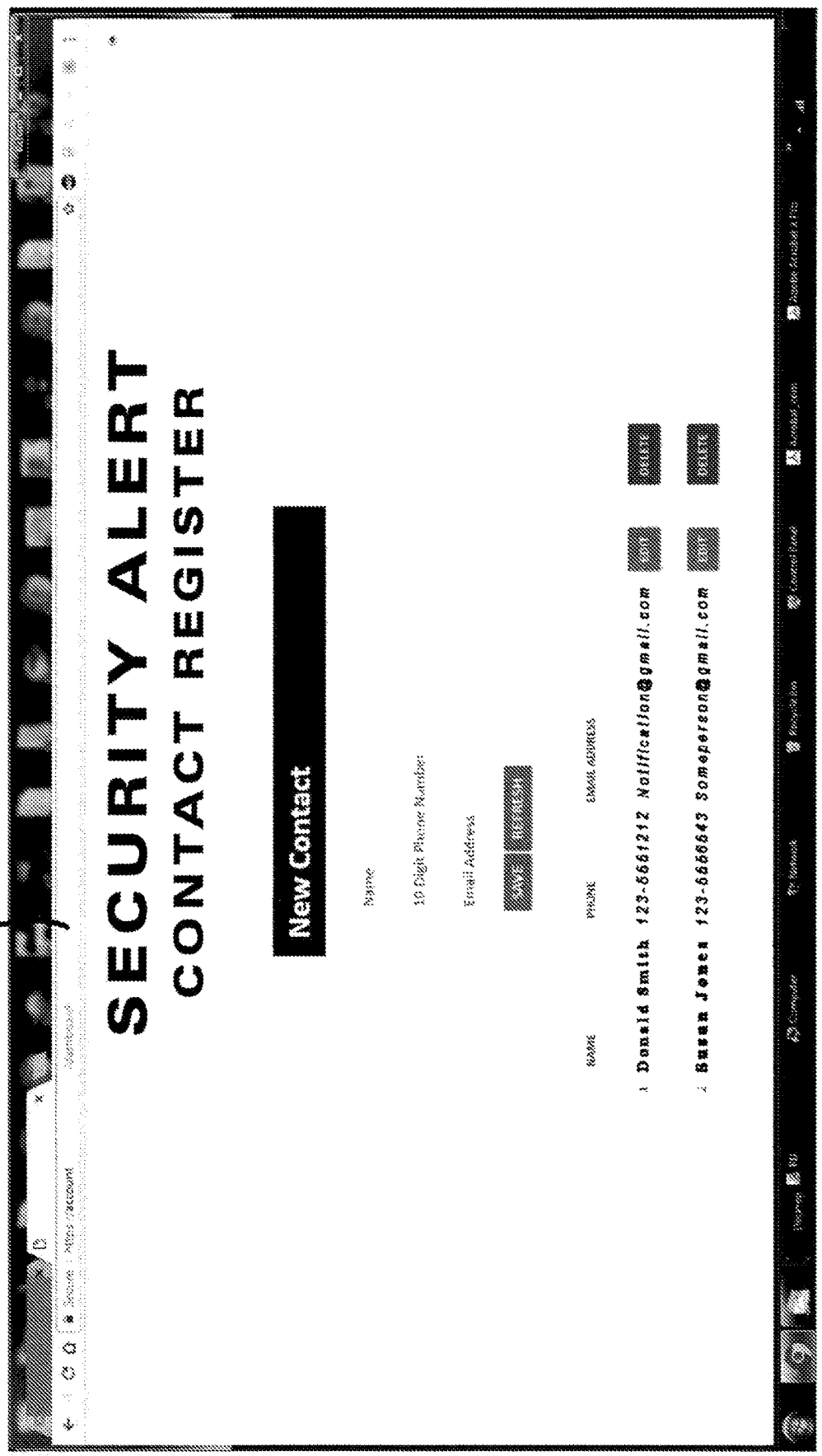
FIG. 15 is a screen shot of a Security Alert Contact Register dashboard in which a user determines who is to be contacted upon determination of select object hand contact or proximity in which at least one of the embodiments of the present invention is shown.

FIG. 15 is a screen shot of a user webpage data access dashboard 290 with the title "Security Alert Contact Register". This system associated user programmable contact webpage provides the user or monitoring person the means by which to remotely select those persons to receive an audio, push message or email alert when automatically requested when contact or proximity is detected with select object or select area in which at least one of the embodiments of the present invention is shown.

In at least one embodiment, the functions of the device or method described may be implemented in software, firmware, hardware, or any combination thereof. When implemented in software, the functions may be transmitted, as one or more instructions or code on, over or stored on at least one computer-readable medium. The computer-readable media may include both communication media and computer storage media, including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

All of these embodiments and the invention disclosed herein are intended to be within the scope herein disclosed. These and other embodiments of the invention will become readily apparent to those skilled in the art from the detailed description of at least one embodiment having reference to the attached figures, the embodiments not being limited to any particular embodiment disclosed. Also, the invention disclosed herein suitably may be practiced in the absence of any element which is not specifically disclosed herein.

While certain embodiments have been shown and described, it will be understood that there is no intent to limit the invention by such disclosure, but rather, is intended to cover all modifications and alternate constructions falling within the spirit and scope of the invention as defined in the appended claims.

Although the invention has been explained in relation to at least one embodiment, it is to be understood that many other possible modifications and variations may be made without departing from the spirit and scope of the invention.

What is claimed is:

1. A security system for monitoring the presence of a person's hand in the vicinity in at least one of a select object and space comprising:
   a. a special purpose computer;
   b. a capacitance charge controller;
   c. a detection electrode;
   d. a wireless means of communications;
   e. a remote monitoring device capable of receiving a control signal directly or indirectly from the capacitance charge controller;
   f. at least one annunciator;
   g. a signaling device;
   h. a monitoring camera system;
   i. at least one processor; and
   j. at least one non-transitory computer readable medium, wherein the selected object may be selected from the group consisting of a retail item, cash, art, a weapon, jewelry, valuables, documents, alcohol and drugs.

2. A security system for monitoring the presence of a person's hand in the vicinity in at least one of a select object and space comprising:
   a. a special purpose computer;
   b. a capacitance charge controller;
   c. a detection electrode;
   d. a wireless means of communications;
   e. a remote monitoring device capable of receiving a control signal directly or indirectly from the capacitance charge controller;
   f. at least one annunciator;
   g. a signaling device;
   h. at least one processor; and
   i. at least one non-transitory computer readable medium, wherein the selected object may be selected from the group consisting of a retail item, cash, art, a weapon, jewelry, valuables, documents, alcohol and drugs.

3. The system of claim 1, further comprising at least one specially programmed smart phone or monitor capable of viewing images captured by the system associated monitoring camera system capable of directly or indirectly communicating those images with a user.

4. The system of claim 2, further comprising at least one remote monitoring device selected from the group consisting of a monitor screen, PDA, phone, iPad, and tablet.

5. The system of claim 1, wherein the special purpose computer is configured to detect a change of an electrical capacitance or charge at an electrode operatively associated with a select monitored object or space whose change in charge at the electrode is caused by the presence of a person's hand in vicinity with such object or space.

6. The system of claim 1, wherein the special purpose computer is configured to detect a change of charge or capacitance at a detection electrode operatively associated with the detection of the presence of a person's hand in the vicinity of at least one of a monitored select object and space, wherein the signaling device is configured to wirelessly communicate an alert signal to a specific remote monitoring device, in a specific means, as prescribed according to a web accessible contact register in response to determination of such electrical change.

7. The system of claim 2, wherein the special purpose computer is configured to detect a change of charge or capacitance at a detection electrode operatively associated with the detection of the presence of a person's hand in the vicinity of at least one of a monitored select object and space, wherein the signaling device is configured to wirelessly communicate a signal in response to determination of such electrical change.

8. The system of claim 1, wherein the signaling device is configured to wirelessly communicate an alert signal to a remote monitoring device in response to electronically determining the presence of a person's hand in vicinity to at least one of a select object and space.

9. The system of claim 2, wherein the signaling device is configured to wirelessly communicate an alert signal to a specific remote monitoring device, in a specific means, as prescribed according to a web accessible contact register in response to electronically determining the presence of a person's hand in vicinity to at least one of a select object and space.

10. The system of claim 1, wherein the monitoring camera system comprises an image recording device.

11. The system of claim 1, wherein the monitoring camera system is configured to be actuated and commence image recording upon a detection in change of an electrical capacitance or charge at an electrode operatively associated with a at least one of a monitored select object and space and whose change in charge at the electrode is caused by electronically determining a person's hand in the vicinity of such object or space.

12. The system of claim 1, wherein the monitoring camera system records and stores only that incremental period of video data that occurred forensically salient and prior to, during and after a person is in the vicinity of at least one of a monitored select object and space upon activation of the capacitive charge controller's determination of a change in charge at a system associated detection electrode, wherein the operation of the monitoring camera system is improved by retaining only the essential video imaging data that is recorded in aforementioned time period directly associated with and reflecting such activation of the controller.

13. The system of claim 1, wherein the monitoring camera system is configured to forensically record and wirelessly transmit the recorded image in real-time to a remote location.

14. The system of claim 3, wherein the monitoring camera system is configured to forensically record and wirelessly transmit the recorded image in real-time to a remote location.

15. The camera monitoring system of claim 3 further composing a means wherein the monitoring camera system is operatively associated with a Pan-Tilt-Zoom (PTZ) device thereby providing a direct or indirect means for redirecting the field of view of the associated camera from one field of view to another.

16. The system of claim 1, wherein the at least one annunciator comprises being capable of generating an alert of at least one of a light, sound, wireless remote notification, the recording of an image, or the activation of an actuator based on detecting and monitoring the presence of a person in the vicinity of at least one of a select object and space.

17. The system of claim 2, wherein the at least one annunciator comprises being capable of generating an alert of at least one of a light, sound, wireless remote notification or the activation of an actuator based on detecting and monitoring the presence of a person in the vicinity of at least one of a select object and space.

18. The system of claim 1, wherein the monitoring camera system may comprise a digital camera serving as an image capturing unit, a communication unit configured to transmit image information captured by the monitoring camera system to an external device, and a remote display terminal configured to display image information captured by the monitoring camera system, wherein the display terminal is configured to display image information captured by the monitoring camera system according to prescribed conditions and user instructions.

19. The system of claim 1, further comprising at least one remote image viewing device selected from the group consisting of a monitor screen, PDA, phone, iPad, and tablet.

20. A security system for monitoring the presence of a person's hand in the vicinity in at least one of a select object and space comprising:
  a. a special purpose computer;
  b. a capacitance charge controller;
  c. a detection electrode;
  d. a wireless means of communications;
  e. a remote monitoring device capable of receiving a control signal directly or indirectly from the capacitance charge controller;
  f. at least one annunciator;
  g. a signaling device;
  h. a camera system;
  i. a PTZ camera controlling device;
  j. at least one processor; and
  k. at least one non-transitory memory medium,
    wherein the selected object may be selected from the group consisting of a retail item, cash, art, a weapon, jewelry, valuables, documents, alcohol and drugs.

21. The system of claim 19, wherein the special purpose computer is configured to detect a change of an electrical capacitance or charge at a detection electrode operatively associated with a select monitored object or space whose change in charge at the electrode is caused by the presence of a person's hand in vicinity with such object or space.

22. The system of claim 20, further comprising at least one monitoring camera system functionally associated with a PTZ device whose field of view is capable of being automatically re-directed and changed from an existing alternate field of view to a more specific, pre-programmed field of view imaging at least one of a monitored select object and space by a controller as a result of an electronic determination, by the controller, of change in charge or capacitance at a system associated electrode controlling the PTZ, thereby capturing all or part of the entirety of the image of a subject person.

23. The system of claim 20, further comprising at least one monitoring camera system, functionally associated with a Pan-Tilt-Zoom device whose field of view is capable of being automatically re-directed and changed from one of an alternate field of view to a more specific, pre-set, pre-programmed field of view, configured for best imaging at least one of a monitored select object and space, and whose cause of re-direction is a direct result of the capacitive charge controller's determination of change in charge or capacitance at a system associated detection electrode caused by the presence of a person's hand in the vicinity of such select object or space.

24. The system of claim 20, further comprising at least one monitoring camera system, functionally associated with a camera Pan-Tilt-Zoom device remotely controlled by a user through a user's PDA control application, monitor or similar device and whose camera's field of view is capable of being re-directed and changed from one of an alternate field of view to a more specific field of view thereby enhancing imaging of a subject person while aiding in identification of that person subsequent to reception of an electronic warning issued to the user when a change in charge or capacitance at a system associated detection electrode is determined.

25. The system of claim 20, further comprising at least one monitoring camera system, functionally associated with a processor, software and logic to apply image recognition to those directly or indirectly captured images by the monitoring camera system, of a subject person in vicinity of the select object or space, thereby providing a means of assisting the user with identifying a subject person when a change in charge or capacitance at a system associated electrode is determined by the capacitive charge controller.

\* \* \* \* \*